United States Patent
Oryoji et al.

(10) Patent No.: US 10,400,738 B2
(45) Date of Patent: Sep. 3, 2019

(54) CONTROL DEVICE FOR INTERNAL COMBUSTION ENGINE

(71) Applicant: Hitachi Automotive Systems, Ltd., Hitachinaka-shi, Ibaraki (JP)

(72) Inventors: Kazuhiro Oryoji, Tokyo (JP); Yoshihiko Akagi, Hitachinaka (JP)

(73) Assignee: HITACHI AUTOMOTIVE SYSTEMS, LTD., Hitachinaka-Shi (JP)

(*) Notice: Subject to any disclaimer, the term of this patent is extended or adjusted under 35 U.S.C. 154(b) by 0 days.

(21) Appl. No.: 15/742,099

(22) PCT Filed: Jun. 22, 2016

(86) PCT No.: PCT/JP2016/068450
§ 371 (c)(1),
(2) Date: Jan. 5, 2018

(87) PCT Pub. No.: WO2017/006761
PCT Pub. Date: Jan. 12, 2017

(65) Prior Publication Data
US 2018/0195487 A1    Jul. 12, 2018

(30) Foreign Application Priority Data
Jul. 7, 2015  (JP) ................. 2015-135744

(51) Int. Cl.
*F02P 5/15* (2006.01)
*F02D 43/00* (2006.01)
(Continued)

(52) U.S. Cl.
CPC ............ *F02P 5/1516* (2013.01); *F02D 15/02* (2013.01); *F02D 15/04* (2013.01); *F02D 37/02* (2013.01);
(Continued)

(58) Field of Classification Search
CPC ...... F02D 13/02; F02D 13/0203; F02D 15/04; F02D 35/02; F02D 41/00; F02D 41/0007;
(Continued)

(56) References Cited

U.S. PATENT DOCUMENTS

2007/0095328 A1*  5/2007  Brehob ................. F02D 41/005
                                                        123/406.47
2011/0307159 A1    12/2011  Nakasaka
(Continued)

FOREIGN PATENT DOCUMENTS

DE    10 2010 027882 A1    10/2011
JP         S62-060934 A      3/1987
(Continued)

OTHER PUBLICATIONS

International Search Report with English translation and Written Opinion issued in corresponding application No. PCT/JP2016/068450 dated Sep. 20, 2016.
(Continued)

*Primary Examiner* — John Kwon
*Assistant Examiner* — Johnny H Hoang
(74) *Attorney, Agent, or Firm* — Foley & Lardner LLP

(57) ABSTRACT

It is an object of the present invention to provide a control device for an internal combustion engine capable of appropriately controlling compression ratio and ignition timing before the target compression ratio that is set according to humidity is attained. A control device for an internal combustion engine controls the internal combustion engine including a cylinder, humidity detection means for detecting humidity of outside air supplied to the cylinder, a variable compression ratio mechanism for changing a compression ratio of the cylinder, and an ignition device igniting air-fuel mixture in the cylinder, and the control device includes: a compression ratio control unit controlling the variable com-
(Continued)

pression ratio mechanism; and an ignition control unit controlling ignition timing of the ignition device, wherein corresponding characteristics between compression ratio and ignition timing are determined for each humidity according to a predetermined condition of an operation state of the internal combustion engine, the compression ratio control unit determines a target compression ratio of the variable compression ratio mechanism according to the detected humidity, and while the variable compression ratio mechanism changes a compression ratio to the target compression ratio, the ignition control unit controls the ignition device on the basis of corresponding characteristics determined according to the detected humidity.

12 Claims, 27 Drawing Sheets

(51) Int. Cl.
| | |
|---|---|
| *F02D 15/04* | (2006.01) |
| *F02D 15/02* | (2006.01) |
| *F02D 37/02* | (2006.01) |
| *F02D 13/02* | (2006.01) |
| *F02D 35/02* | (2006.01) |
| *F02D 41/00* | (2006.01) |
| *F02P 5/04* | (2006.01) |
| *F02P 5/152* | (2006.01) |

(52) U.S. Cl.
CPC .............. *F02D 43/00* (2013.01); *F02P 5/15* (2013.01); *F02P 5/1502* (2013.01); *F02P 5/1504* (2013.01); *F02D 13/0203* (2013.01); *F02D 13/0269* (2013.01); *F02D 35/02* (2013.01); *F02D 35/023* (2013.01); *F02D 41/0007* (2013.01); *F02D 41/0062* (2013.01); *F02D 2200/0418* (2013.01); *F02D 2700/03* (2013.01); *F02P 5/045* (2013.01); *F02P 5/152* (2013.01); *Y02T 10/46* (2013.01)

(58) Field of Classification Search
CPC ... F02D 43/00; F02P 5/04; F02P 5/045; F02P 5/15; F02P 5/1516

USPC .................. 123/435, 436; 701/102–105, 108
See application file for complete search history.

(56) References Cited

U.S. PATENT DOCUMENTS

| | | | |
|---|---|---|---|
| 2011/0315101 A1 | 12/2011 | Cleary et al. | |
| 2012/0271533 A1* | 10/2012 | Shishime | F02D 35/021 701/105 |
| 2014/0261336 A1* | 9/2014 | Takahashi | F02D 15/02 123/48 R |
| 2014/0316672 A1* | 10/2014 | Uhrich | G01N 27/223 701/102 |
| 2014/0316676 A1* | 10/2014 | Pursifull | F02P 5/045 701/103 |
| 2015/0083081 A1* | 3/2015 | Surnilla | F02M 26/08 123/406.48 |
| 2015/0128587 A1* | 5/2015 | Dane | F02M 45/02 60/605.2 |
| 2016/0115880 A1* | 4/2016 | Kondo | F02P 5/15 123/406.55 |
| 2016/0201635 A1* | 7/2016 | Nagano | F02P 5/045 123/491 |
| 2016/0348595 A1* | 12/2016 | Kiyomura | F02D 15/02 |

FOREIGN PATENT DOCUMENTS

| | | |
|---|---|---|
| JP | S63-230961 A | 9/1988 |
| JP | H01-200029 A | 8/1989 |
| JP | H07-042915 B2 | 5/1995 |
| JP | 2005-147103 A | 6/2005 |
| JP | 2010-084618 A | 4/2010 |
| JP | 2015-117652 A | 6/2015 |
| WO | WO-2010/073411 A1 | 7/2010 |

OTHER PUBLICATIONS

Extended European Search Report dated Feb. 13, 2019 in the Application No. 16821231.4.

* cited by examiner

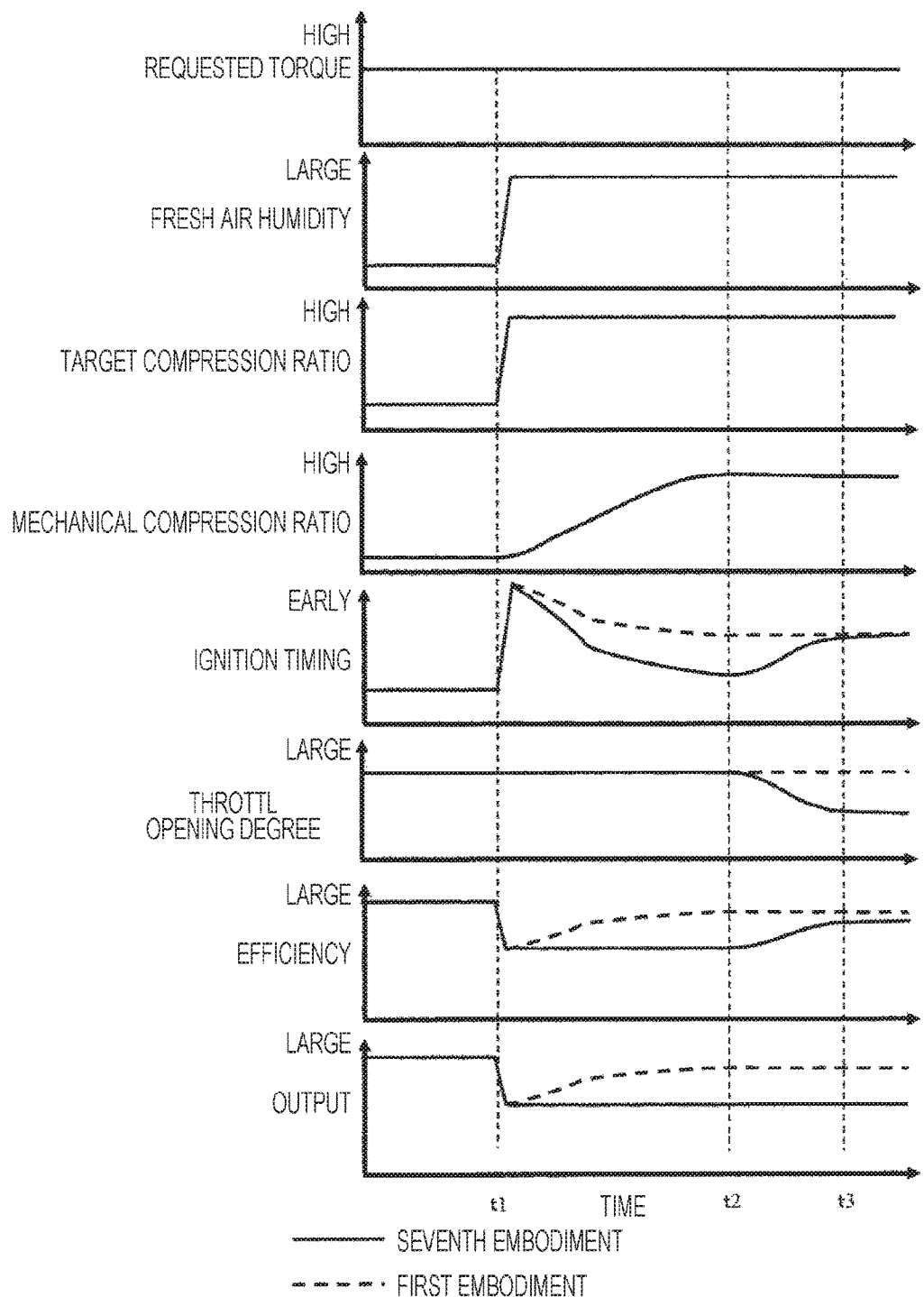

CONTROL DEVICE FOR INTERNAL COMBUSTION ENGINE

TECHNICAL FIELD

The present invention relates to a control device of an engine, and more particularly, to a control technique of an engine equipped with a variable compression ratio mechanism (variable compression ratio device, variable valve) used for reducing fuel consumption of the engine.

BACKGROUND ART

There is an engine equipped with a variable compression ratio mechanism in order to reduce fuel consumption of an automobile. In this case, unless otherwise specified, the compression ratio means both of a ratio between the cylinder volume at the bottom dead center of the piston and the cylinder volume at the top dead center of the piston, i.e., a so called mechanical compression ratio, and a ratio between a cylinder volume at a closing timing of an intake valve provided in an internal combustion engine and a cylinder volume at the top dead center of the piston, i.e., a so-called actual compression ratio. The higher the compression ratio is, the higher the thermal efficiency of the internal combustion engine attains. For this reason, in order to reduce the fuel consumption of an automobile, it is effective to increase the compression ratio of the internal combustion engine. However, due to the high compression ratio of the internal combustion engine, the pressure and the temperature in the internal combustion engine are increased, so that abnormal combustion such as knocking occurs. In particular, abnormal combustion tends to occur under a condition of a low engine speed and a condition of a high engine output. For this reason, the setting of the appropriate compression ratio varies depending on the output of the engine and the condition of the rotational speed. The variable compression ratio mechanism is a mechanism for increasing the compression ratio in a low load condition and the like where a high compression ratio is possible, and reducing the compression ratio in a high load condition and the like where there is a high possibility of knocking, so that the fuel consumption reduction can be maximized by increasing the compression ratio.

By the way, the setting of the appropriate compression ratio is affected by the outside world in addition the operation condition (rotation speed, output) of the engine. As a known example of the variable compression ratio mechanism taking the influence of the outside world into consideration, there is a control device of an internal combustion engine described in PTL 1 and PTL 2. These known examples disclose a control device of an internal combustion engine that controls the compression ratio according to the detected humidity and a control device of an internal combustion engine that controls the ignition timing according to the change of the compression ratio.

CITATION LIST

Patent Literature

PTL 1: Japanese Unexamined Patent Application Publication No. S62-60934
PTL 2: Japanese Examined Patent Application Publication No. H7-42915

SUMMARY OF INVENTION

Technical Problem

The technique described in PTL 1 is a technique for detecting the humidity in the atmosphere and controlling the variable compression ratio so that the higher the detected humidity is, the higher the compression ratio attains. The technique described in PTL 2 is a technique that controls the variable compression ratio mechanism and the ignition timing so that different ignition timing is set according to the compression ratio to be set. By using these techniques, it is possible to set appropriate the compression ratio and the ignition timing according to the humidity. However, there is a control delay until the target compression ratio can be realized by the control of the variable compression ratio mechanism, and in these known examples, it was impossible to control appropriate ignition timing until the change of the compression ratio has been completed.

Therefore, it is an object of the present invention to provide a control device for an internal combustion engine that can properly control the compression ratio and the ignition timing until a target compression ratio set according to the humidity is attained.

Solution to Problem

The present invention is characterized in that corresponding characteristics between compression ratio and ignition timing are determined for each humidity in accordance with a predetermined condition about an operation state of an internal combustion engine, and a target compression ratio of the variable compression ratio mechanism is determined in accordance with the detected humidity, and while the variable compression ratio mechanism changes a compression ratio to the target compression ratio, the ignition control unit controls the ignition device on the basis of corresponding characteristics determined according to the detected humidity.

According to the above configuration, while the variable compression ratio mechanism carries out control toward the target value, appropriate ignition timing can be set according to the compression ratio in the operation, and the efficiency can also be maximized during the operation of the variable compression ratio mechanism.

The control device for the internal combustion engine preferably have a correlation in which an increase amount of a compression ratio and a retard amount of ignition timing are positive during control of the variable compression ratio mechanism. In this case, while the variable compression ratio mechanism performs control to the target, the ignition timing can be set to maximize the efficiency according to the compression ratio during operation, and the efficiency can be maximized including the operation of the variable compression ratio mechanism.

The control device for the internal combustion engine preferably controls the compression ratio and the ignition timing by taking into account the humidity of the outside air and the exhaust gas amount flowing back. In this case, the efficiency in the operation of the variable compression ratio mechanism can also be maximized even in the control of the internal combustion engine equipped with a system that refluxes exhaust gas in view of the difference of the degrees of influence of the EGR rate and the humidity.

In a case where the internal combustion engine includes temperature detection means for detecting a temperature of outside air, the control device for the internal combustion engine may be preferably configured so that the ignition timing that is set on the basis of the corresponding characteristics between the compression ratio and the ignition timing determined for each humidity in accordance with a predetermined condition about an operation state is corrected in accordance with the temperature detected by the detection means, and the ignition device is controlled. In this case, it is possible to set the compression ratio in view of the temperature change of the outside world, to control the ignition timing in view of the influence of the external temperature affecting the abnormal combustion, and even when the temperature change occurs, the efficiency can be maximized.

In a case where the internal combustion engine includes pressure detection means detecting pressure in the cylinder, the control device for the internal combustion engine is preferably configured so that the target compression ratio is corrected in the decreasing direction when a maximum value in a combustion cycle of the pressure detected by the pressure detection means exceeds a reference value that is set in advance, and while the variable compression ratio mechanism changes a compression ratio to the target compression ratio, the ignition control unit controls the ignition device on the basis of corresponding characteristics determined according to the detected humidity. In this case, abnormal combustion in the cylinder of the engine is directly detected, and it is possible to control the compression ratio and the ignition timing while avoiding abnormal combustion.

In a case where a change rate of the detected humidity is less than a reference value when a state changes from a state in which the detected humidity is high to a state in which the detected humidity is low, the control device for the internal combustion engine may be configured such that the ignition control unit controls the ignition timing to retard the ignition timing, the compression ratio control unit controls the compression ratio to the target compression ratio that is set according to the humidity, and after the compression ratio attains the target compression ratio, the ignition control unit controls the ignition device on the basis of corresponding characteristics determined according to the compression ratio and the detected humidity. In this case, if the detected humidity change is from a high state to a low state, the ignition timing control based on the corresponding characteristics determined according to the detected compression ratio and the humidity that is normally carried out is avoided, and the ignition timing with high responsiveness is retarded first, so that it is possible to avoid abnormal combustion and then to set an appropriate compression ratio afterwards.

In a case where the internal combustion engine includes a device controlling air amount flowing into the cylinder, the control device for the internal combustion engine is considered to be have an air amount control unit controlling the device controlling the air amount, and is preferably configured such that when a control for increasing a compression ratio is carried out, the ignition control unit carries out control for retarding ignition timing as compared with setting of ignition timing on the basis of corresponding characteristics determined according to the compression ratio and the detected humidity, and after the compression ratio attains a target compression ratio, control is performed so that a decrease amount of air amount flowing into the cylinder by the air amount control unit and an advance angle amount of ignition timing by the ignition control unit have a positive correlation. Alternatively, the control device for the internal combustion engine is preferably configured so that after the compression ratio attains a target compression ratio, control is performed so that a decrease amount of air amount flowing into the cylinder by the air amount control unit and an advance angle amount of ignition timing by the ignition control unit have a positive correlation.

In this case, when controlling the compression ratio and ignition timing according to the detected humidity, the ignition timing according to the compression ratio can be retarded as compared with the ignition timing based on the corresponding characteristics determined according to the compression ratio and the humidity, and it is possible to suppress output rise due to the improved efficiency when controlling the compression ratio.

When the internal combustion engine includes a device controlling air amount flowing into the cylinder, the control device for the internal combustion engine is considered to have a configuration of including an air amount control unit controlling the device controlling the air amount, and is preferably configured such that means for detecting a requested torque for the internal combustion engine is provided, and under a condition of variation where a change in the requested torque detected by the requested torque detection means stays within a predetermined range, and when the humidity detected by the humidity detection means changes, control is performed so that, after the compression ratio attains a target compression ratio, a decrease amount of air amount flowing into the cylinder by the air amount control unit and an advance angle amount of ignition timing by the ignition control unit have a positive correlation. In this case, if the fluctuation of the detected requested torque is within the predetermined range, the compression ratio can be controlled so that torque becomes constant with respect to control of the compression ratio according to the detected humidity, and the torque fluctuation caused by the compression ratio control can be suppressed.

Advantageous Effects of Invention

According to the present invention, the compression ratio and the ignition timing can be controlled appropriately until the target compression ratio set according to the humidity is attained.

BRIEF DESCRIPTION OF DRAWINGS

FIG. 27 is a conceptual diagram illustrating various types of operation and engine performance changes at the time of the control of the compression ratio and the ignition timing according to the humidity in seventh embodiment.

DESCRIPTION OF EMBODIMENTS

Hereinafter, embodiments of the present invention will be described with reference to the drawings. First, the configuration common to the following embodiments will be described with reference to FIGS. 1, 2, and 3.

Figure 1:
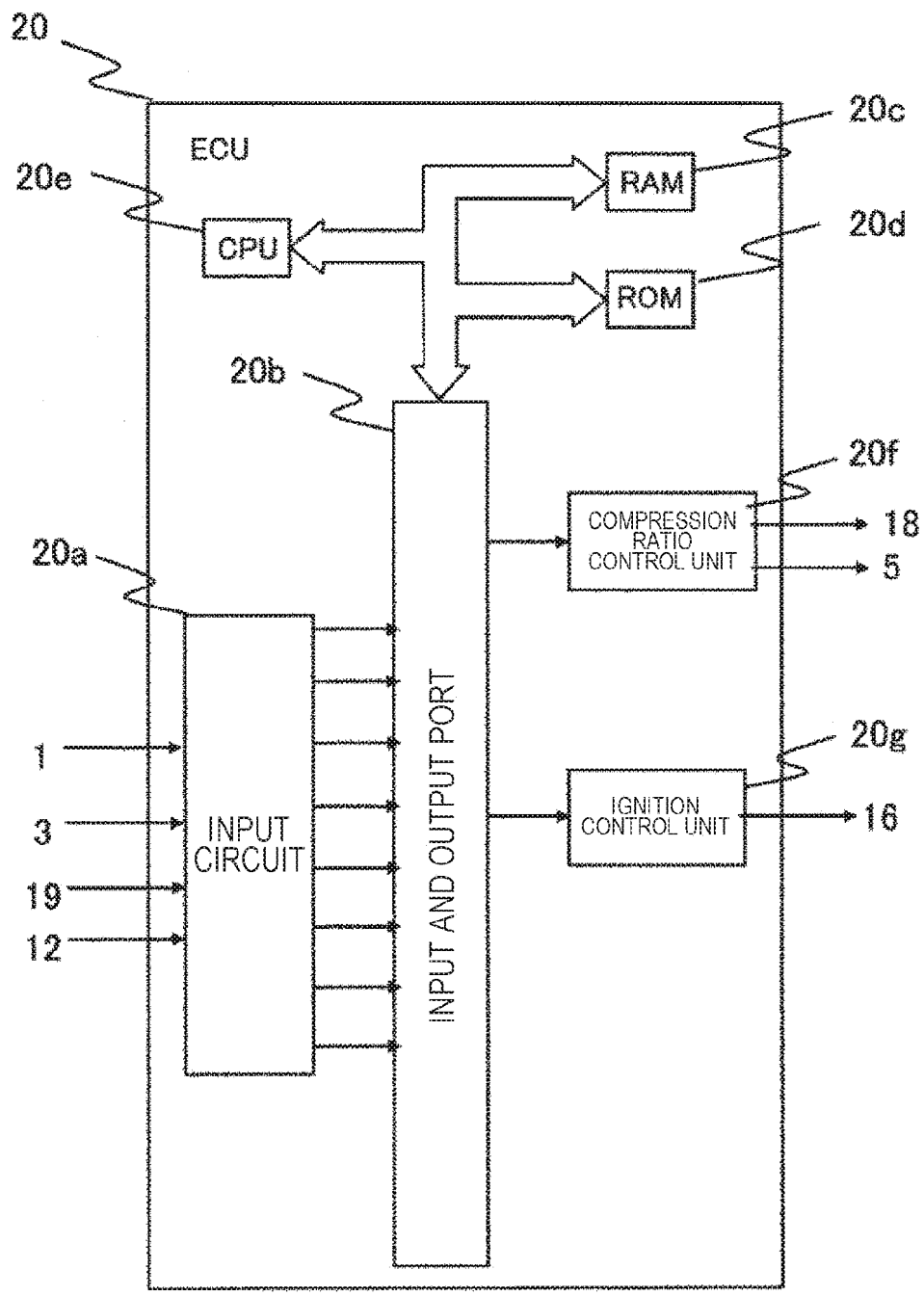
FIG. 1 is a system configuration diagram illustrating a control device of an engine according to an embodiment of the present invention.

FIG. 1 is a system block diagram illustrating a configuration of a control device of an engine according to an embodiment of the present invention. Output signals from an air flow sensor 1, a humidity sensor 3, an accelerator opening degree sensor 12, and a crank angle sensor 19 are input into an input circuit 20a of an ECU 20. However, the input signal is not limited to only these. The received input signal of each sensor is sent to an input port in an input and output port 20b. The value sent to the input port 20b is stored in a RAM 20c and processed by a CPU 20e. The control program describing the computation processing content is written in a ROM 20d in advance.

The value indicating the activation amount of each actuator computed according to the control program is stored in the RAM 20c, and then sent to the output port in the input and output port 20b and sent to each actuator via each driving circuit. In the present embodiment, there are a compression ratio control unit 20f and an ignition control unit 20g as a driving circuit. Each circuit controls the variable compression ratio mechanism (variable compression ratio device 18, variable valve 5), the energizing timing to the ignition coil 16. In the present embodiment, it is a device provided with a driving circuit in the ECU 20. However, the present invention is not limited thereto, and any one of the driving circuits may be provided in the ECU 20.

In order to determine the target compression ratio according to the detected humidity and to realize the target compression ratio, the ECU 20 detects the compression ratio while the compression ratio is switching toward the target value when either or both of the variable compression ratio device 18 and the variable valve 5 are controlled, the ECU 20 sets the ignition timing on the basis of the corresponding characteristics determined on the basis of the detected compression ratio and the humidity, and the ECU 20 energizes the input power to the ignition coil at appropriate timing.

Figure 2:
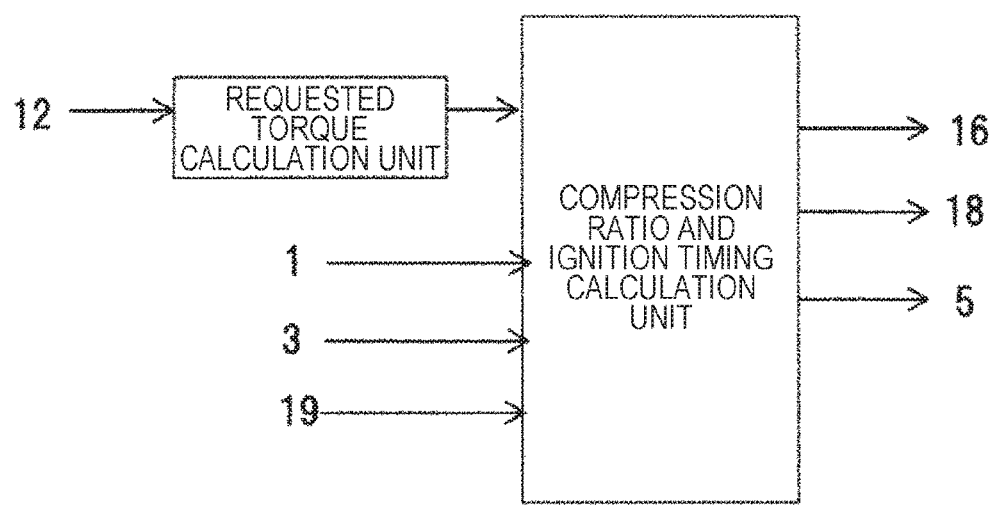
FIG. 2 is a system block diagram illustrating a configuration of a control device of an engine according to an embodiment of the present invention.

FIG. 2 is a diagram illustrating an outline of control logic of the compression ratio and the ignition timing carried out in the ECU 20 of the control device of the engine according to an embodiment of the present invention. This is constituted by a requested torque calculation unit for calculating requested torque and requested air amount on the basis of the output of the accelerator opening degree sensor 12 and a compression ratio and ignition timing control unit calculating the control amount of the variable compression ratio mechanism and the ignition timing on the basis of the humidity of the fresh air calculated on the basis of the output of humidity sensor 3 and the output of the crank angle sensor 19. The accelerator opening degree sensor 12 is input into the requested torque calculation unit, and the humidity sensor signal 3 is input into the compression ratio and ignition timing control unit, so that the control of the variable compression ratio mechanism 18, the energizing timing of the ignition coil 16, and the variable valve 5 are carried out.

Figure 3:
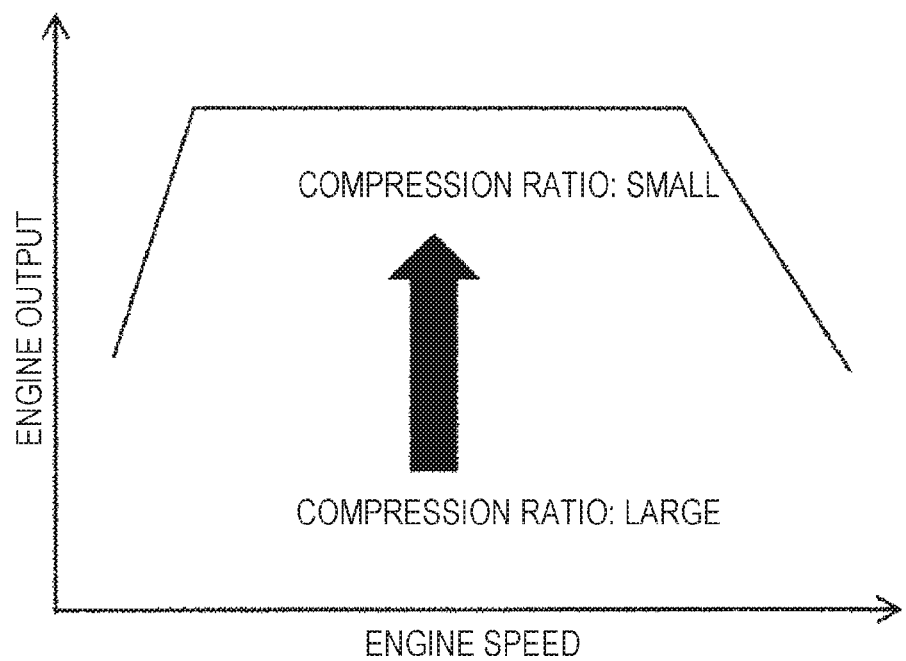
FIG. 3 is a conceptual diagram illustrating an engine map data of a compression ratio according to an embodiment of the present invention.

FIG. 3 is a map that defines a standard setting of the compression ratio on the engine map. The setting of compression ratio is often set to be small from the condition with small engine output to the condition with big engine output. In this case, it is assumed that a map of a compression ratio is constituted by a reference temperature Tref and the outside air condition of dry air. The constructed map of FIG. 3 is saved in the ROM 20d.

First Embodiment

Figure 4:
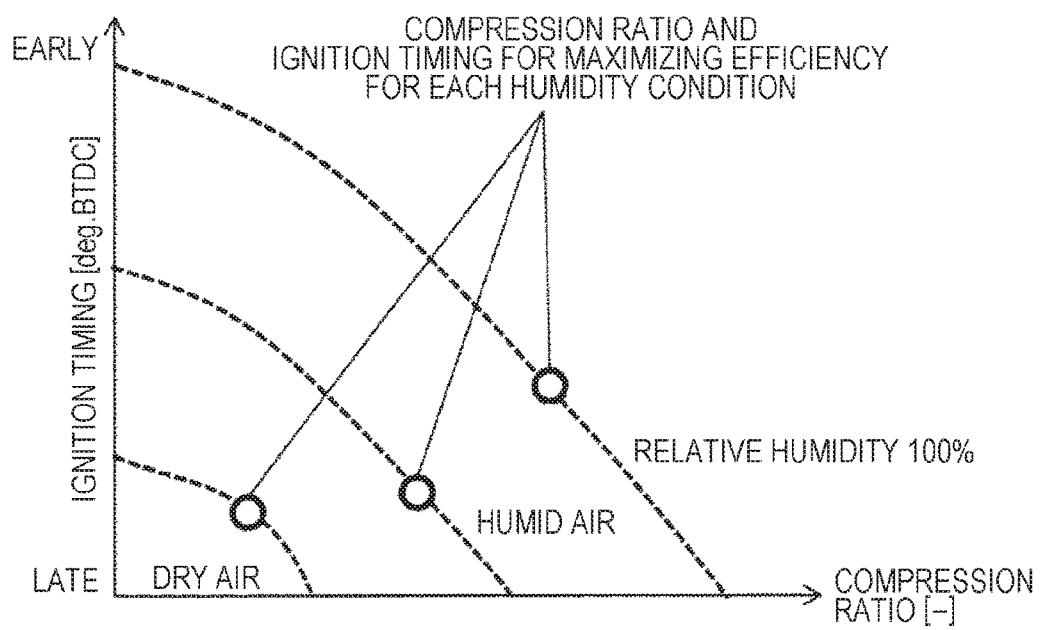
FIG. 4 is a conceptual diagram illustrating engine map data of corresponding characteristics of the compression ratio and the ignition timing according to a first embodiment.

Subsequently, the first embodiment will be described next. FIG. 4 is a figure for defining the ignition timing according to the humidity, the target value of the compression ratio, and the corresponding characteristics determined according to the detected humidity under a condition where the engine operation conditions (engine output, engine speed) are fixed. Outline circles indicate the target compression ratios and the ignition timings for dry air, humid air, and relative humidity 100%. Broken lines indicate corresponding characteristics according to the humidity condition. An outline circle indicates the compression ratio and the ignition timing where the efficiency is maximized for each humidity condition. In general, the higher the humidity is, the higher the target compression ratio is set, and when compared with the same compression ratio, the ignition timing indicated by the corresponding characteristics tends to be earlier as the humidity is higher. FIG. 4 is a diagram at a specific operation condition, and the ROM 20d has a map of corresponding characteristics that defines a similar relationship under a plurality of operation conditions.

Figure 5:
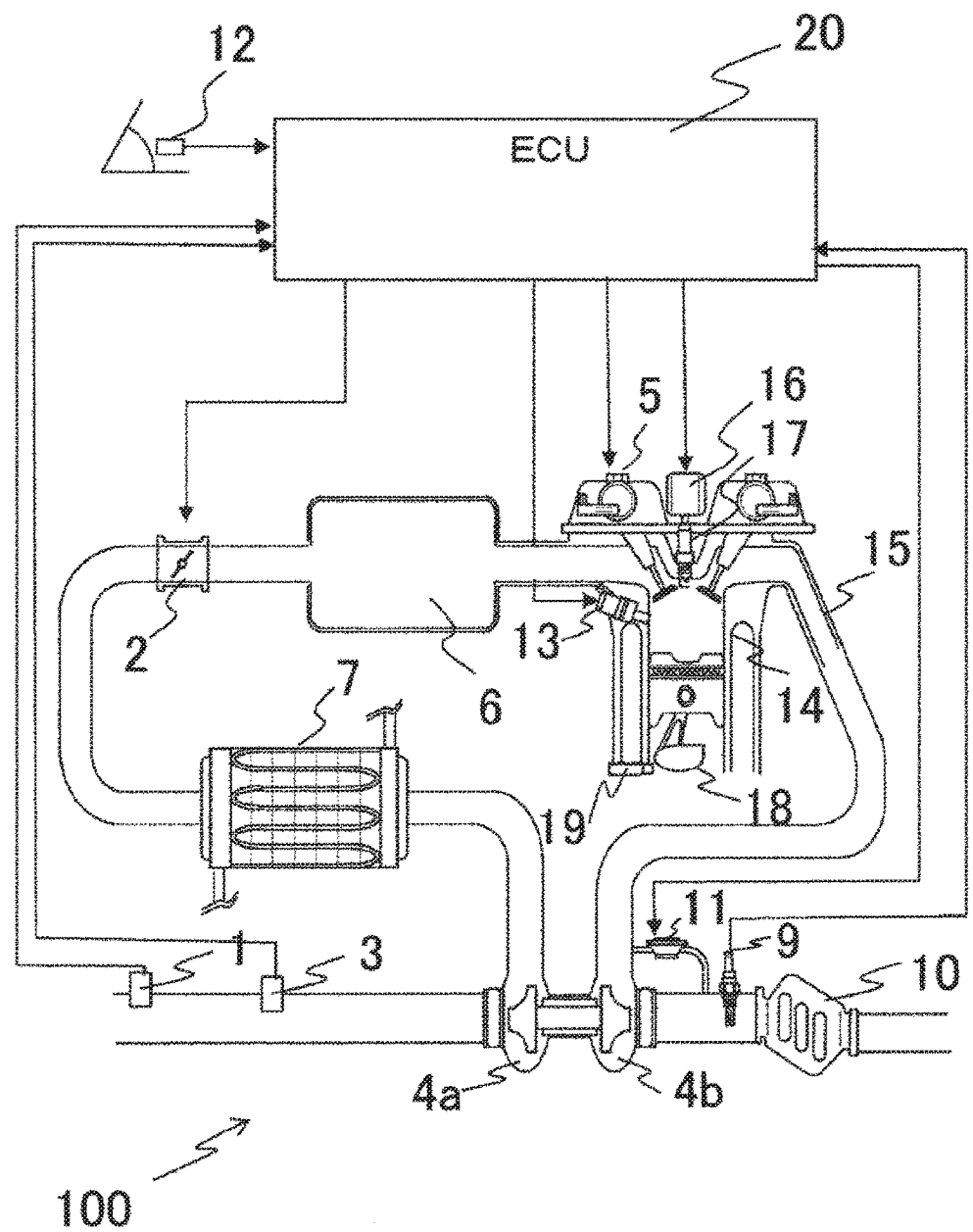
FIG. 5 is a block diagram illustrating a configuration of an engine according to the first embodiment.

FIG. 5 is a block diagram illustrating a direct injection type gasoline engine for an automobile equipped with a humidity sensor 3. The engine 100 is a gasoline engine for automobile that performs a spark ignition type combustion. An air flow sensor 1 for measuring the intake air amount and the intake air temperature, a humidity sensor 3 which serves as intake air humidity detection means, a compressor 4a of a supercharger for supercharging intake air, an intercooler 7 for cooling the intake air, and an electronic control throttle 2 for adjusting the intake air tube pressure are provided at appropriate positions of the intake air tube. In this case, the humidity sensor 3 is a sensor capable of detecting relative humidity and absolute humidity. The engine 100 is provided with a fuel injection device (hereinafter referred to as an injector) 13 for injecting fuel into the cylinder 14 of each cylinder and an ignition device (ignition coil 16, ignition plug 17) for supplying ignition energy for each cylinder. A variable valve 5 for adjusting the gas flowing into or out of the cylinder is provided in the cylinder head. The intake air amount and the internal EGR amount for all the cylinders are adjusted by adjusting variable valve 5. Although not shown in the drawing, a high pressure fuel pump for supplying high pressure fuel to the fuel injection device 13 is connected to the fuel injection device 13 via fuel piping, and in the fuel pipe, a fuel pressure sensor for measuring the fuel injection pressure is provided.

The engine 100 is equipped with a variable compression ratio device 18 which controls the movement amount of the piston, and a crank angle sensor 19 for detecting the piston position of the engine is attached. The output value of the crank angle sensor 19 is sent to the ECU 20. In this case, the variable compression ratio device 18 and variable valve 5 are also referred to as a variable compression ratio mechanism because the compression ratio can be controlled by its operation.

Further, a turbine 4b for applying a rotational force to the compressor 4a of the supercharger by exhaust energy, an electronic control waste gate valve 11 for adjusting the exhaust flow amount flowing to the turbine, a three-way catalyst 10 for purifying the exhaust gas, and an air-fuel ratio sensor 9 which is an embodiment of an air-fuel ratio detection device and detects the air-fuel ratio of the exhaust gas at a position upstream of the three-way catalyst 10 are provided at appropriate positions of the exhaust pipe 15. Although not shown, a temperature sensor 45 for measuring the temperature of the cooling water circulating in the engine is provided.

The signals obtained from the air flow sensor 1, the humidity sensor 3, and the air-fuel ratio sensor 9 are sent to the engine control unit (ECU) 20. A signal obtained from the accelerator opening degree sensor 12 is sent to the ECU 20. The accelerator opening degree sensor 12 detects the depression amount of the accelerator pedal, i.e., the accelerator opening degree. The ECU 20 computes the requested torque on the basis of the output signal of the accelerator opening degree sensor 12. More specifically, the accelerator opening degree sensor 12 is used as a requested torque detection sensor that detects the requested torque to the engine. The ECU 20 computes the rotation speed of the engine on the basis of the output signal of the crank angle sensor. On the basis of the operation state of engine obtained from the outputs of various types of sensor, the ECU 20 computes, in an optimum manner, major activation amounts of the engine such as an air flow amount, a fuel injection amount, ignition timing, fuel pressure, and the like.

The fuel injection amount computed by the ECU 20 is converted into an open valve pulse signal and sent to the injector 13. An ignition signal is sent to the ignition plug 16 so that the ignition plug 16 ignites with the ignition timing computed by the ECU 20. The throttle opening degree computed by the ECU 20 is sent to the electronic control throttle 2 as a throttle driving signal.

Fuel is injected to the air flowing into the cylinder 14 from the intake air tube via the intake air valve and forms an air-fuel mixture. The air-fuel mixture explodes due to the spark generated from the ignition plug 16 at the specified ignition timing and pushes down the piston by its combustion pressure to make the driving force of the engine. Furthermore, the exhaust gas having exploded passes through the exhaust pipe 15 and is sent to the three-way catalyst 10, and the exhaust component is purified in the three-way catalyst 10 and discharged to the outside.

Figure 6:
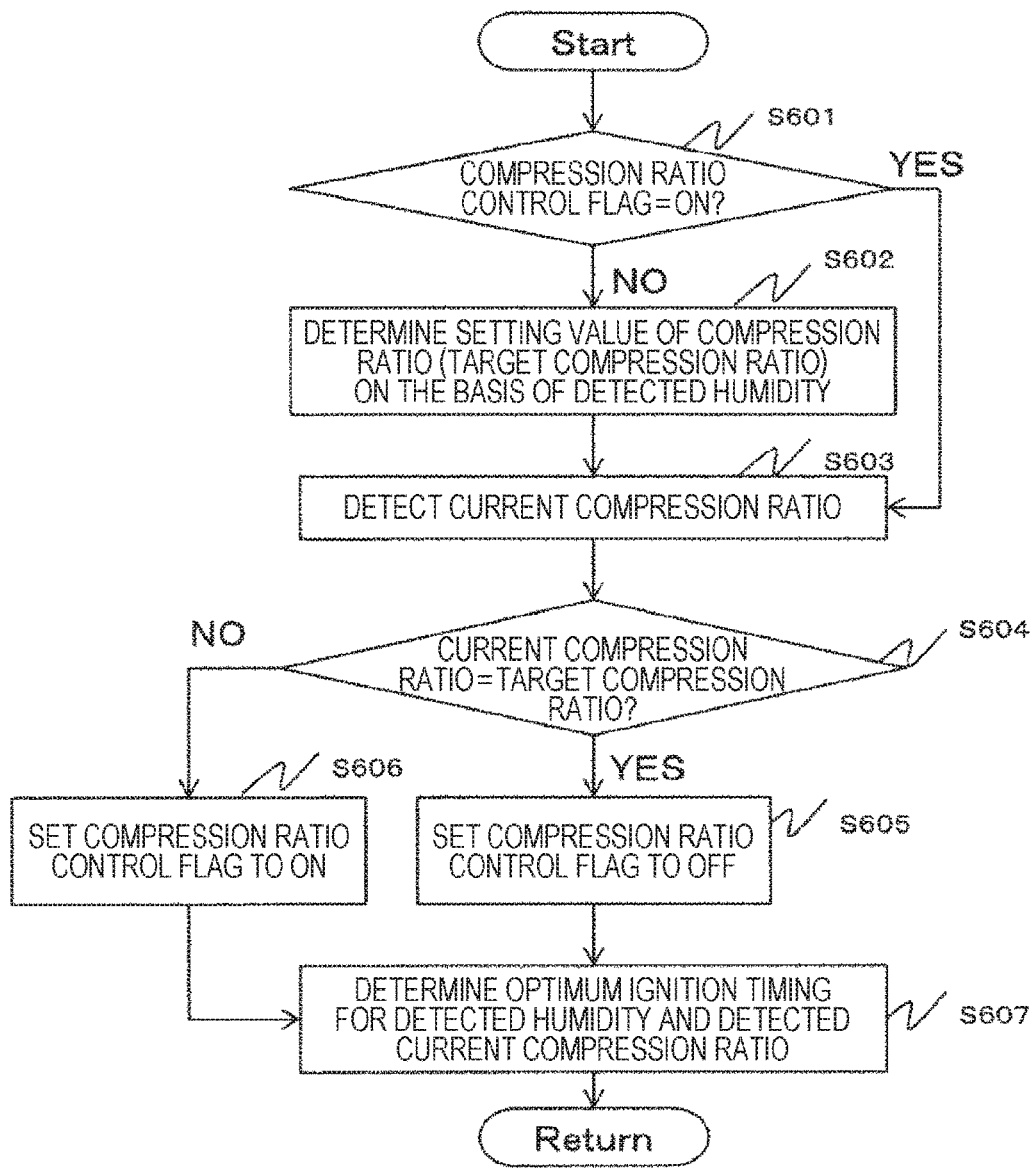
FIG. 6 is a flowchart illustrating the control contents of the compression ratio and the ignition timing according to the humidity by the control device of the engine according to the first embodiment.

FIG. 6 describes computation processing implemented by the compression ratio and ignition timing control unit of FIG. 2. First, in step S601, a check is performed as to whether the compression ratio control flag indicating whether the compression ratio is under control or not is ON or OFF. In this case, ON indicates that the compression ratio control is being performed, OFF indicates that the compression ratio control is paused. If the compression ratio control flag is ON, step S603 is subsequently performed, and if the compression ratio control flag is OFF, step S602 is subsequently performed.

In step S602, the setting ratio (target compression ratio) of the compression ratio is determined on the basis of the detected humidity. In this case, the target compression ratio can be determined from the map of the corresponding characteristic of the actual compression ratio and the ignition timing determined for each humidity stored in the ROM 20d as shown in FIG. 4 and the corresponding characteristics determined according to detected humidity. The humidity has the effect of slowing down the autoignition reaction that causes knock and has the effect of suppressing flame propagation speed after ignition with ignition plug, and therefore, the compression ratio that maximizes efficiency depends on humidity. The optimum compression ratio can be selected by determining the compression ratio from the corresponding characteristics of the compression ratio and ignition timing determined for each humidity as described above.

Figure 7:
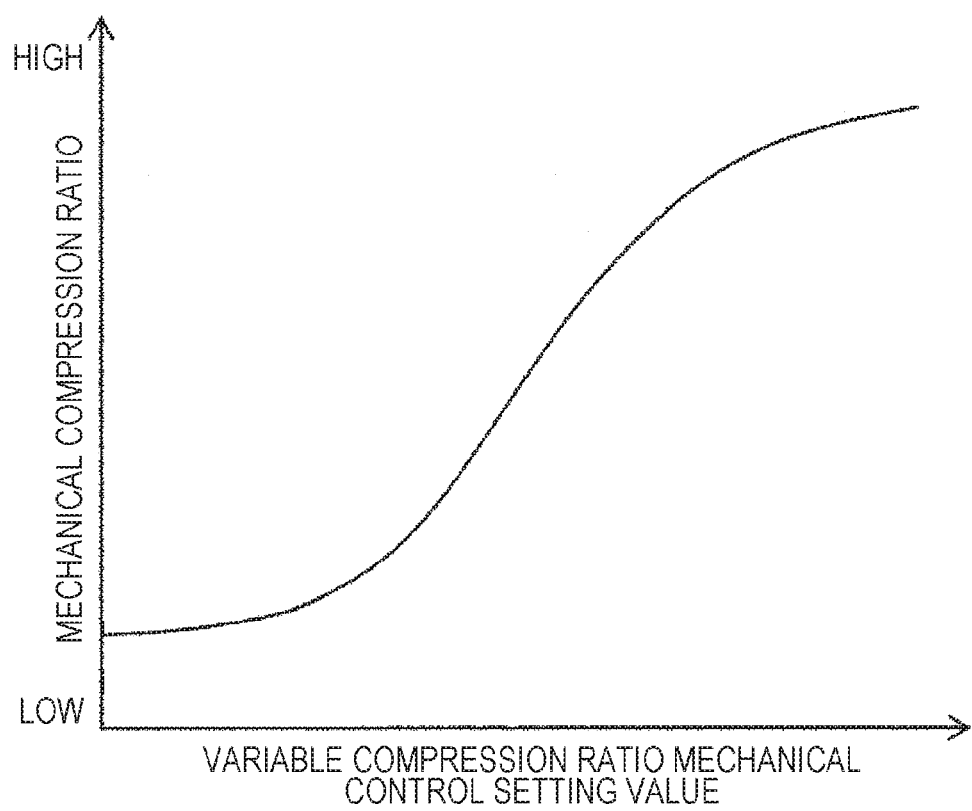
FIG. 7 is a conceptual diagram illustrating variable compression ratio device control setting value and compression ratio.

In step S603, the current compression ratio is detected. The ROM 20d stores the relationship map between the actuator operation amount and the compression ratio of the variable compression ratio device 18 as shown in FIG. 7, and the current compression ratio can be detected on the basis of this map. In step S604, a detection is performed as to whether the detected current compression ratio is the same as the target compression ratio. In a case where the detected current compression ratio is determined to be the same as the target compression ratio, step S605 is subsequently performed, and if the detected current compression ratio is determined not to be the same as the target compression ratio, step S606 is subsequently performed. In step S605, the compression ratio control flag is set to OFF, and step S607 is subsequently performed. In step S606, the compression ratio control flag is set to ON, and step S607 is subsequently performed.

Figure 8:
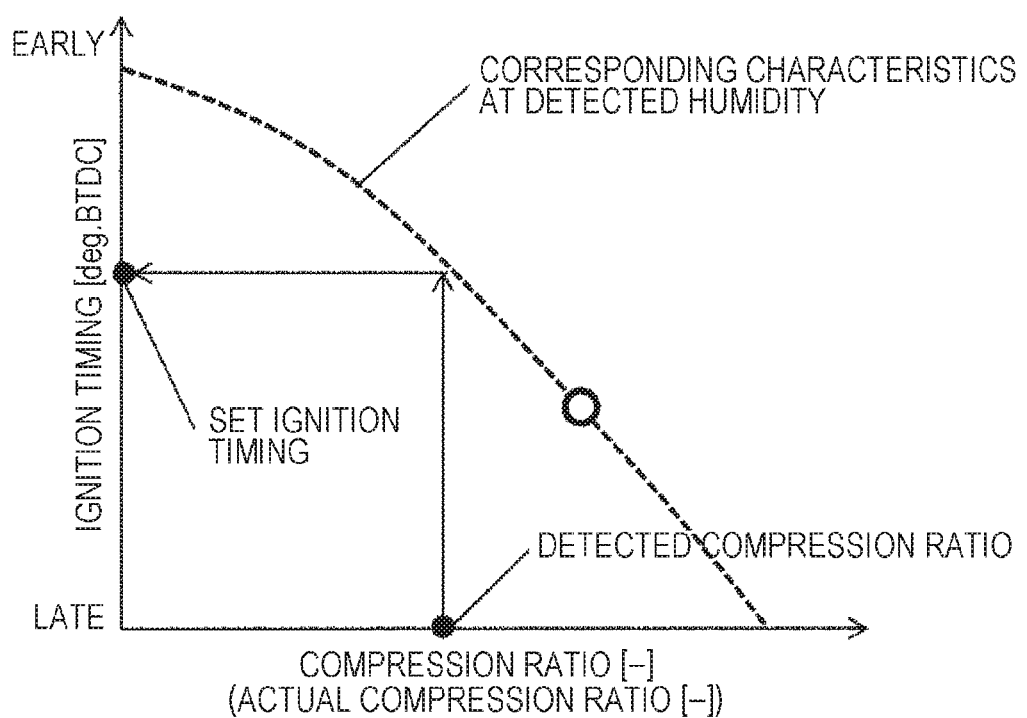
FIG. 8 is a conceptual diagram illustrating ignition timing setting procedure on the basis of the corresponding characteristics between the compression ratio and the ignition timing.

In step S607, the ignition timing is determined on the basis of the corresponding characteristics between the compression ratio and the ignition timing determined for each humidity given in FIG. 4 and the detected humidity and the detected current compression ratio. Step S607 is executed until the variable compression ratio mechanism attains the target value. In this case, as shown in FIG. 8, the ignition timing to be set is determined from the relationship of the corresponding characteristics between the compression ratio and the ignition timing for the detected compression ratio and the detected humidity. By determining the optimum ignition timing on the basis of the detected compression ratio in this manner, appropriate ignition timing can be set according to the operation of the slow-response variable compression ratio mechanism, so that the efficiency can be prevented from degrading during the operation of the variable compression ratio mechanism.

As shown in FIG. 4, the compression ratio and ignition retard amount have positive correlation. By doing this, ignition timing can be set with the condition of the highest efficiency according to the operation of slow-response variable compression ratio mechanism, so that the efficiency reduction during the operation of the variable compression ratio mechanism can be minimized.

Figure 9:
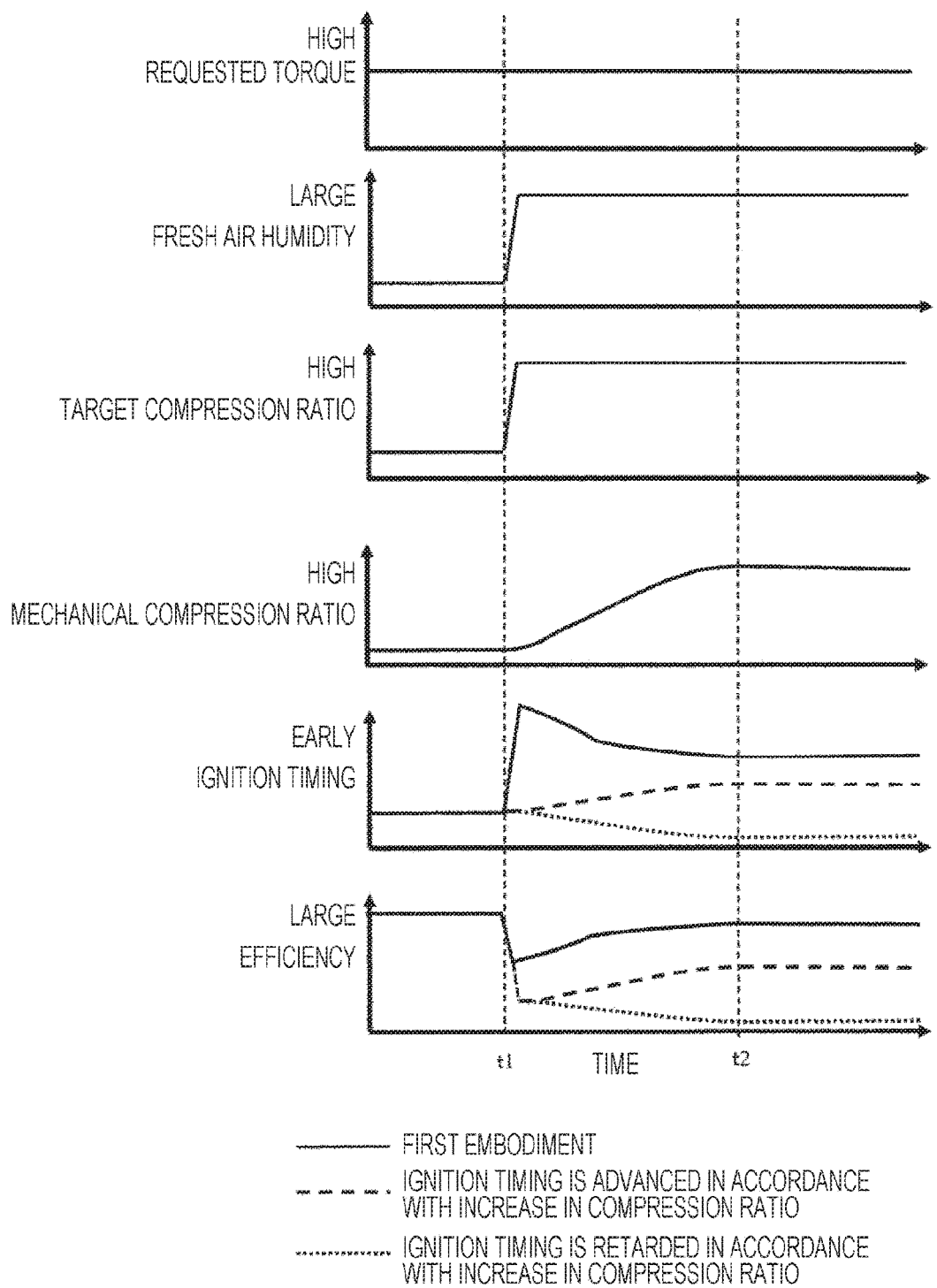
FIG. 9 is a conceptual diagram illustrating various kinds of operation and engine performance changes during control of the compression ratio and the ignition timing according to the humidity in the first embodiment.

FIG. 9 illustrates the movement of compression ratio, ignition timing, and the like, in the case of using the flowchart shown in FIG. 6. Let the timing when the humidity detected by the humidity sensor 3 changes be t1. In accordance with this humidity change, the setting of the target compression ratio changes to the high compression ratio side. The variable compression ratio mechanism is controlled to attain this target value, so that the compression ratio is increased. Let the timing when the compression ratio attains the target compression ratio be t2. In accordance with a change in the detection value of the fresh air humidity at time t1, the ignition timing is advanced. Thereafter, while the variable compression ratio mechanism changes the compression ratio to the target compression ratio, the ignition timing is retarded in accordance with the change in the compression ratio. The ignition timing is made constant at time t2 and thereafter. The movement of the ignition timing when the ignition is advanced in accordance with the compression ratio is indicated by a broken line. The movement of the ignition timing when the ignition is retarded according to the compression ratio is indicated by a dotted line. In these cases, as a function, a difference occurs in the movement of the ignition timing. As a result, as compared to the case where the above control is not applied, the efficiency of the internal combustion engine is higher when the fuel consumption reduction amount and the compression ratio during the change of the compression ratio attains the target values.

According to an embodiment such as the first embodiment, when the compression ratio is made to be a high compression ratio when the humidity changes as a disturbance factor, the optimum actual compression ratio and the optimum ignition timing varying according to the humidity can be set, and the compression ratio can be controlled while the fuel consumption performance is suppressed from experiencing deterioration while the compression ratio changes.

Second Embodiment

Figure 10:
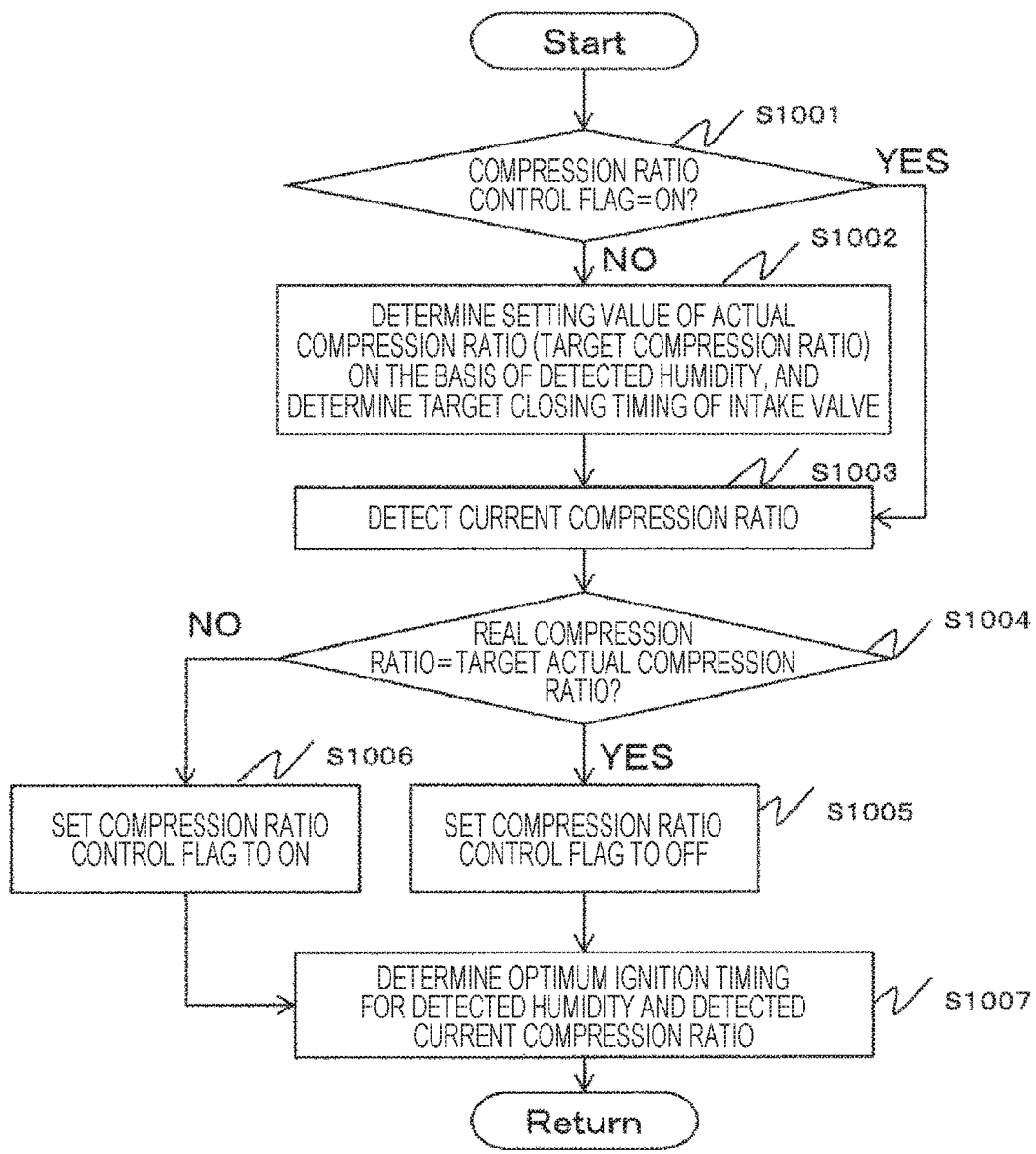
FIG. 10 is a flowchart illustrating control contents of the actual compression ratio and the ignition timing according to the humidity by a control device of an engine according to a second embodiment.

Subsequently, the second embodiment will be explained. FIG. 10 describes computation processing carried out in the compression ratio and ignition timing control unit of FIG. 2. First, in step S1001, a check is performed as to whether the compression ratio control flag indicating whether the compression ratio is under control or not is ON or OFF. In this case, "ON" indicates under control, and "OFF" indicates that the control is inactive. In a case where the compression ratio control flag is ON, step S1003 is subsequently performed. In a case where the compression ratio control flag is OFF, step S1002 is subsequently performed.

Figure 11:
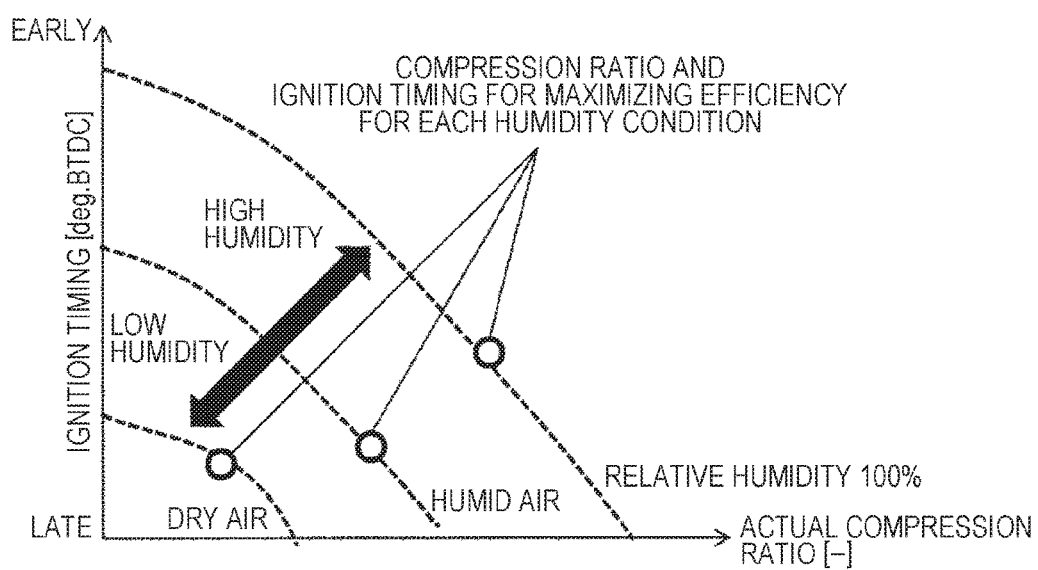
FIG. 11 is a conceptual diagram illustrating engine map data of corresponding characteristics of the actual compression ratio and the ignition timing according to the second embodiment.
Figure 12:
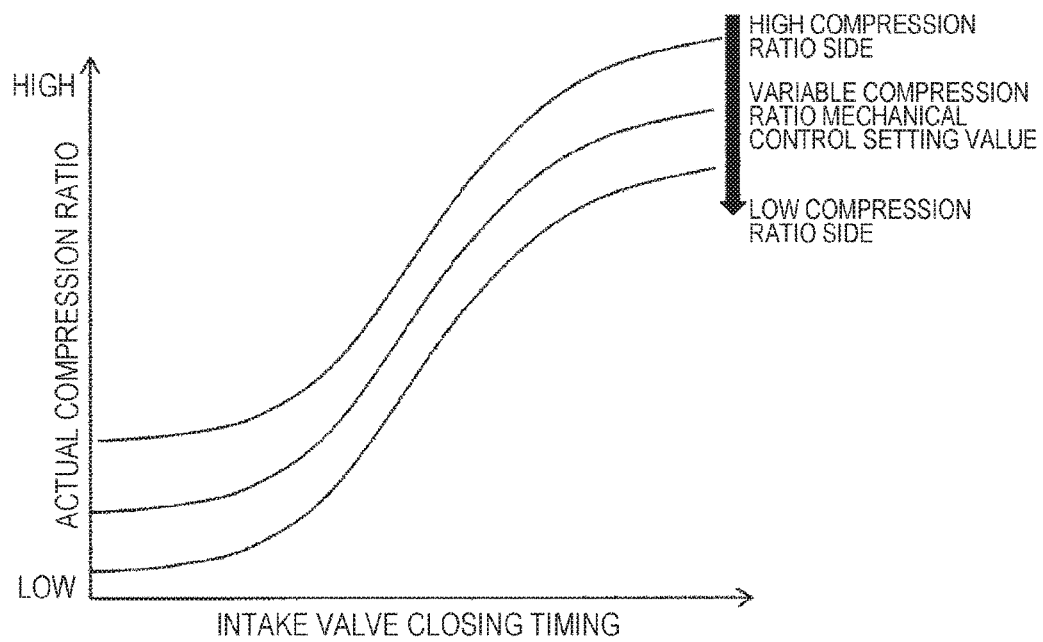
FIG. 12 is a conceptual diagram illustrating control setting of a variable compression ratio device, intake valve closing timing, and actual compression ratio.

In step S1002, a setting ratio (target actual compression ratio) of the compression ratio is determined on the basis of the detected humidity. In this case, the target actual compression ratio can be determined from the corresponding characteristic determined according to the detected humidity and the map of the corresponding characteristics between the actual compression ratio and the ignition timing determined according to the humidity as shown in FIG. 11 stored in the ROM 20d. Although the actual compression ratio that maximizes efficiency depends on the humidity, the optimum actual compression ratio can be selected by determining the actual compression ratio from the corresponding characteristics in this way. In this case, the target actual compression ratio can be determined from the corresponding characteristics determined according to the detected humidity on the basis of the map of the corresponding characteristics between the actual compression ratio and the ignition timing determined according to the humidity as shown in FIG. 11 stored in the ROM 20d. In FIG. 11, an outline circle indicates optimum actual compression ratio and the optimum ignition timing in each humidity condition. In step S1003, the current actual compression ratio is detected. The current actual compression ratio is determined by the operation situation of the variable compression ratio device 18 and the operation situation of the variable valve 5. Qualitatively, as the closing timing of the intake valve moves away from the bottom dead center, the actual compression ratio decreases. The actual compression ratio can be estimated from geometry information about the engine, closing timing of the intake air valve, and the actuator operation amount of the variable compression ratio device 18, and in addition, the actual compression ratio can be detected on the basis of the closing timing of the intake air valve and information about the map having the relationship between the actuator operation amount of the variable compression ratio device 18 and the compression ratio. The ROM 20d stores, as shown in FIG. 12, the relationship between intake valve closing timing and actual compression ratio for each control setting value of the variable compression ratio device, on the basis of which the actual compression ratio can be determined. In step S1004, a detection is performed as to whether the detected current actual compression ratio is the same as the target actual compression ratio. If the detected current actual compression ratio is determined to be the same as the target actual compression ratio, step S1005 is subsequently performed. If the detected current actual compression ratio is determined not to be the same as the target actual compression ratio, step S1006 is subsequently performed. In step S1005, the compression ratio control flag is set to OFF, and step S1007 is subsequently performed. In step S1006, the compression ratio control flag is set to ON, step S1007 is subsequently performed.

In step S1007, the ignition timing is determined on the basis of the detected humidity and the detected current actual compression ratio and the corresponding characteristic between the actual compression ratio and the ignition timing for each humidity given in FIG. 11. As shown in FIG. 8, the ignition timing to be set is determined from the relationship of the corresponding characteristics between the actual compression ratio and the ignition timing for the detected actual compression ratio and the detected humidity. Step S1007 is executed until the actual compression ratio changes to the target value. By determining the optimum ignition timing on the basis of the detected compression ratio in this manner, appropriate ignition timing can be set according to the operation of the slow-response variable compression ratio mechanism, and therefore, the efficiency can be prevented from degrading during the operation of the variable compression ratio mechanism.

As shown in FIG. 11, the compression ratio and ignition retard amount have positive correlation. By doing so, the ignition timing can be set with the condition of the highest efficiency according to the operation of slow-response variable valve, and the efficiency drop during operation of the variable valve can be minimized.

Figure 13:
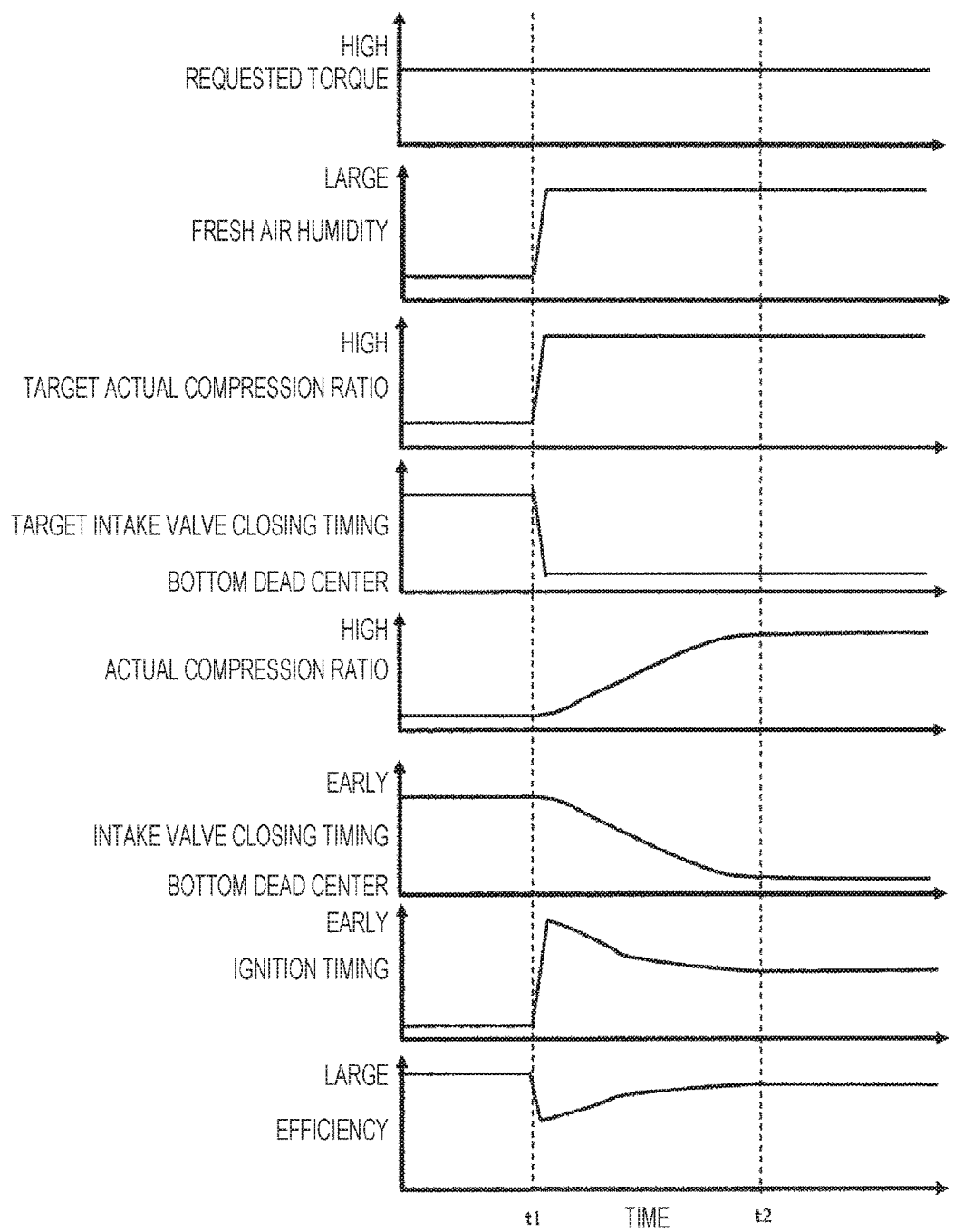
FIG. 13 is a conceptual diagram illustrating various types of operation and engine performance changes at the time of the control of the compression ratio and the ignition timing according to the humidity in the second embodiment.

The movement of the compression ratio and the ignition timing in the case of using the flowchart shown in FIG. 10 is shown in FIG. 13. Let the timing when the humidity detected by the humidity sensor 3 changes be t1. In accordance with this change in the humidity, the setting of the target actual compression ratio changes to the high compression ratio side. In order to realize this actual compression ratio, the target intake valve closing timing is determined. The variable valve 5 is controlled to realize this target intake valve closing timing, and the actual compression ratio is increased. Let the timing when the actual compression ratio attains the target actual compression ratio be t2. In accordance with a change in the detection value of the fresh air humidity at time t1, the ignition timing is advanced. Thereafter, in accordance with the change of the actual compression ratio, the ignition timing is retarded. The ignition timing is made constant at time t2 and thereafter.

According to the control of the second embodiment, when the compression ratio is made to be a high compression ratio when the humidity changes as a disturbance factor, the optimum actual compression ratio and the optimum ignition timing varying according to the humidity can be set, and since the ignition control can be realized according to the optimum ignition timing that changes according to the actual compression ratio, it is possible to suppress the decrease in efficiency while the actual compression ratio changes.

Third Embodiment

Figure 14:
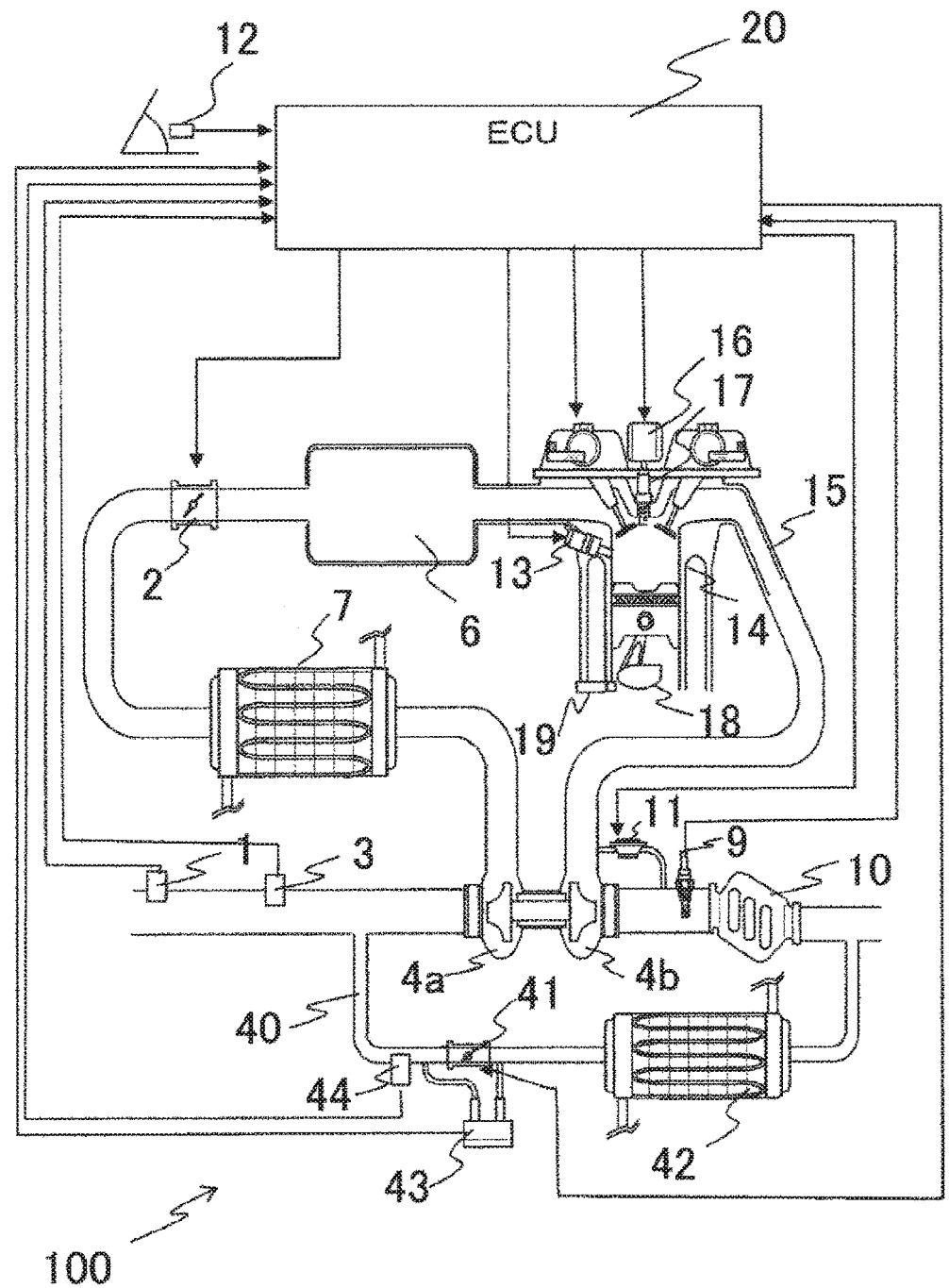
FIG. 14 is a block diagram illustrating a configuration of an engine according to a third embodiment.

Subsequently, the third embodiment will be described. FIG. 14 is a block diagram illustrating the in-cylinder injection type gasoline engine for automobile equipped with a low pressure EGR flow path or the like which is an EGR mechanism. Most of the in-cylinder injection type gasoline engine is common with FIG. 5. Hereinafter, different parts will be described.

An EGR tube 40 for refluxing exhaust to the upstream of the compressor 4a of the intake air tube from the downstream of the exhaust pipe catalyst 10 is provided. An EGR cooler 42 for cooling the EGR, an EGR valve (EGR mechanism) 41 for controlling the EGR flow amount, a differential pressure sensor 43 for detecting a differential pressure across the EGR valve, and an EGR temperature sensor 44 for detecting the EGR temperature are provided at appropriate positions of the EGR tube 40. The signals obtained from the differential pressure sensor 43 and the EGR temperature sensor 44 are sent to the engine control unit (ECU) 20.

Figure 15:
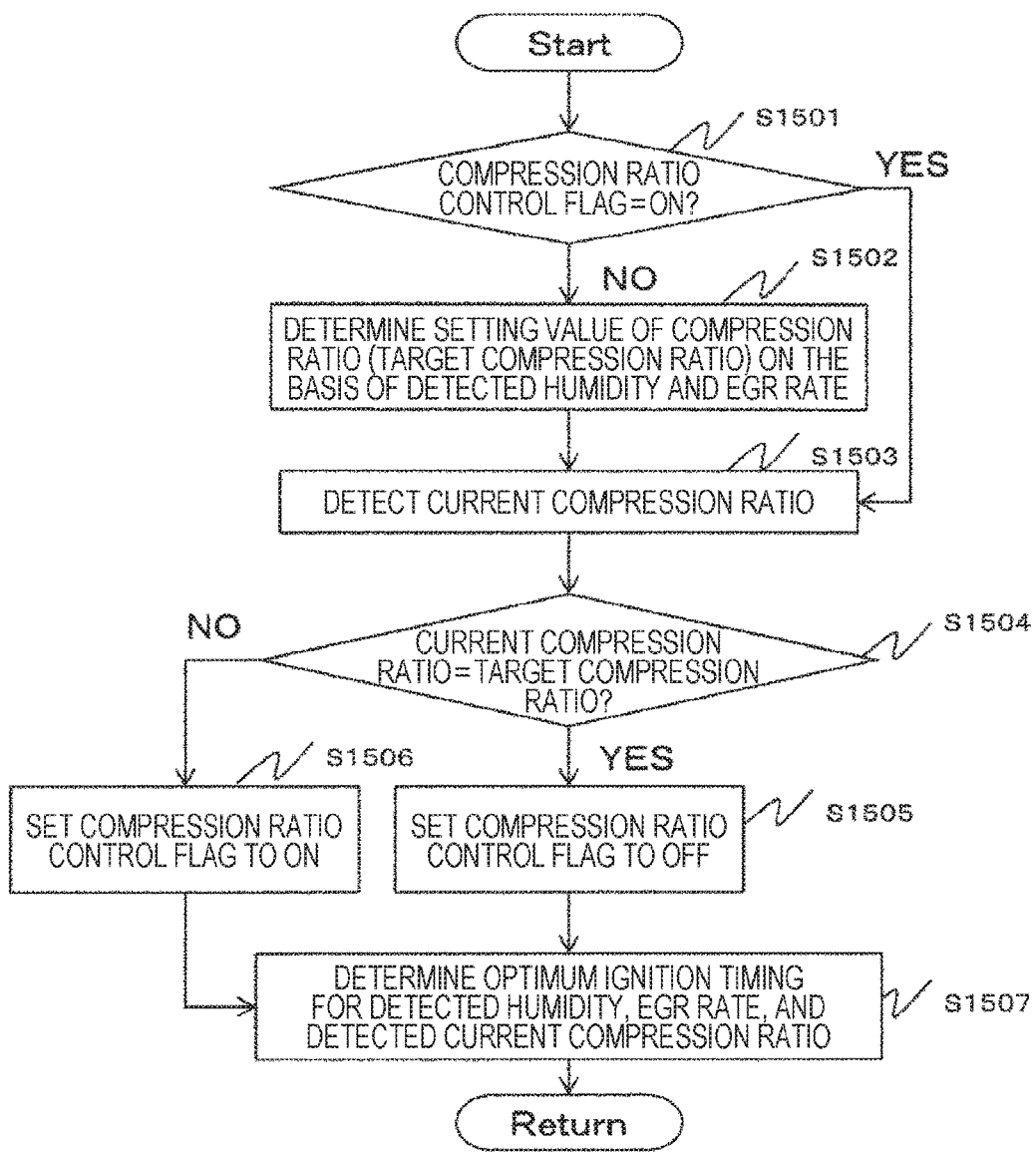
FIG. 15 is a flowchart illustrating control contents of the actual compression ratio and the ignition timing according to the humidity by a control device of an engine according to the third embodiment.

FIG. 15 describes computation processing carried out in the compression ratio and ignition timing control unit of FIG. 2. First, in step S1501, a check is performed as to whether the compression ratio control flag indicating whether the compression ratio is under control or not is ON or OFF. In this case, "ON" indicates under control, and "OFF" indicates that the control is inactive. In a case where the compression ratio control flag is ON, step S1503 is subsequently performed. In a case where the compression ratio control flag is OFF, step S1502 is subsequently performed.

Figure 16:
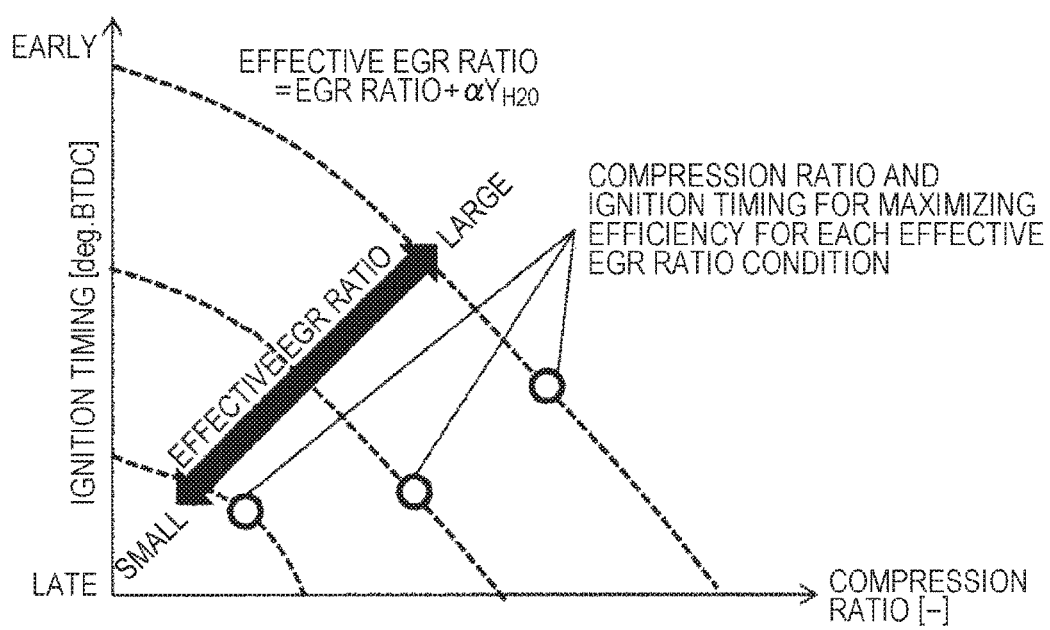
FIG. 16 is a conceptual diagram illustrating engine map data of corresponding characteristics between the compression ratio and the ignition timing according to the third embodiment.

In step S1502, the setting ratio (target compression ratio) of the compression ratio is determined on the basis of the detected EGR rate on the basis of the differential pressure sensor 43, the temperature sensor 44, and the humidity detected by the humidity sensor 3. In this case, for each effective EGR rate, the setting ratio (target compression ratio) of the compression ratio can be determined on the basis of the map illustrating the ignition timing for the target compression ratio and the target compression ratio. In this case, the sum of the EGR rate and a numerical value obtained by multiplying the mass percent of the moisture amount in the air by $\alpha(\geq 1)$ times is defined as an effective EGR rate, and the ROM 20d stores the corresponding characteristics between the compression ratio and the ignition timing for various effective EGR rate conditions in a form as shown in FIG. 16 on the map, and on the basis of this, the corresponding characteristics for the corresponding effective EGR rate are determined and used in step S1502. The EGR gas and the water in the air have the effect of slowing down the autoignition reaction which can be a factor of knocking and has the effect of suppressing the flame propagation speed after the ignition with the ignition plug, and therefore, there is a change in the compression ratio which maximizes efficiency according to the proportion of EGR gas and the rate of water in the air (humidity). Since the EGR gas and the water in the air have different levels of influence on knocking which limits the compression ratio, the target compression ratio is determined by using the corresponding characteristics between the compression ratio and the ignition timing defined for each effective EGR rate and the effective EGR rate as described above, so that the efficiency improvement can be maximized in engine equipped with EGR system. In FIG. 16, an outline circle indicates the optimum actual compression ratio and the optimum ignition timing for each effective EGR rate condition. In step S1503, the current compression ratio is detected. The ROM 20d stores the relationship map between the actuator operation amount and the compression ratio of the variable compression ratio device 18 as shown in FIG. 7 and FIG. 12, and the current compression ratio can be detected on the basis of this map.

In step S1504, a detection is performed as to whether the detected current compression ratio is the same as the target compression ratio. In a case where the detected current compression ratio is determined to be the same as the target compression ratio, step S1505 is subsequently performed. In a case where the detected current compression ratio is determined not to be the same as the target compression ratio, step S1506 is subsequently performed. In step S1505, the compression ratio control flag is set to OFF, and step S1507 is subsequently performed. In step S1506, the compression ratio control flag is set to ON, and step S1507 is subsequently performed.

In step S1507, the ignition timing is determined on the basis of the effective EGR rate, the detected current compression ratio, and the corresponding characteristics between the compression ratio and the ignition timing for each effective EGR rate shown in FIG. 16. Step S1507 is executed until the variable compression ratio mechanism changes to the target value. By determining the optimum ignition timing on the basis of the detected compression ratio in this manner, the ignition timing can be set appropriately according to the operation of the slow-response variable compression ratio mechanism and the change of the EGR rate, so that the efficiency can be prevented from degrading during the operation of the variable compression ratio mechanism.

Figure 17:
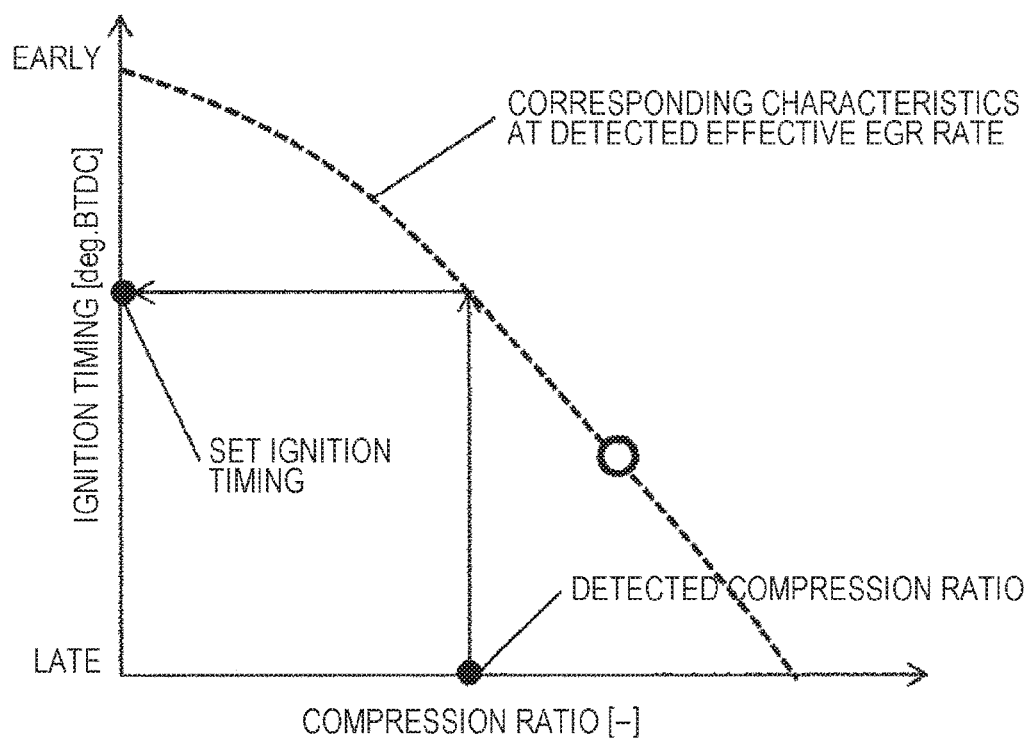
FIG. 17 is a conceptual diagram illustrating setting procedure of the ignition timing on the basis of the corresponding characteristics between the compression ratio and the ignition timing.

More specifically, as shown in FIG. 17, the ignition timing to be set is determined from the relationship of the corresponding characteristics between the compression ratio and the ignition timing for the detected compression ratio and the detected effective EGR rate.

As shown in FIG. 16, the compression ratio and the ignition retard amount have positive correlation. By doing so, the ignition timing can be set with the highest efficiency condition according to the operation of slow-response variable compression ratio mechanism, and the efficiency reduction during the operation of the variable compression ratio mechanism can be minimized.

Figure 18:
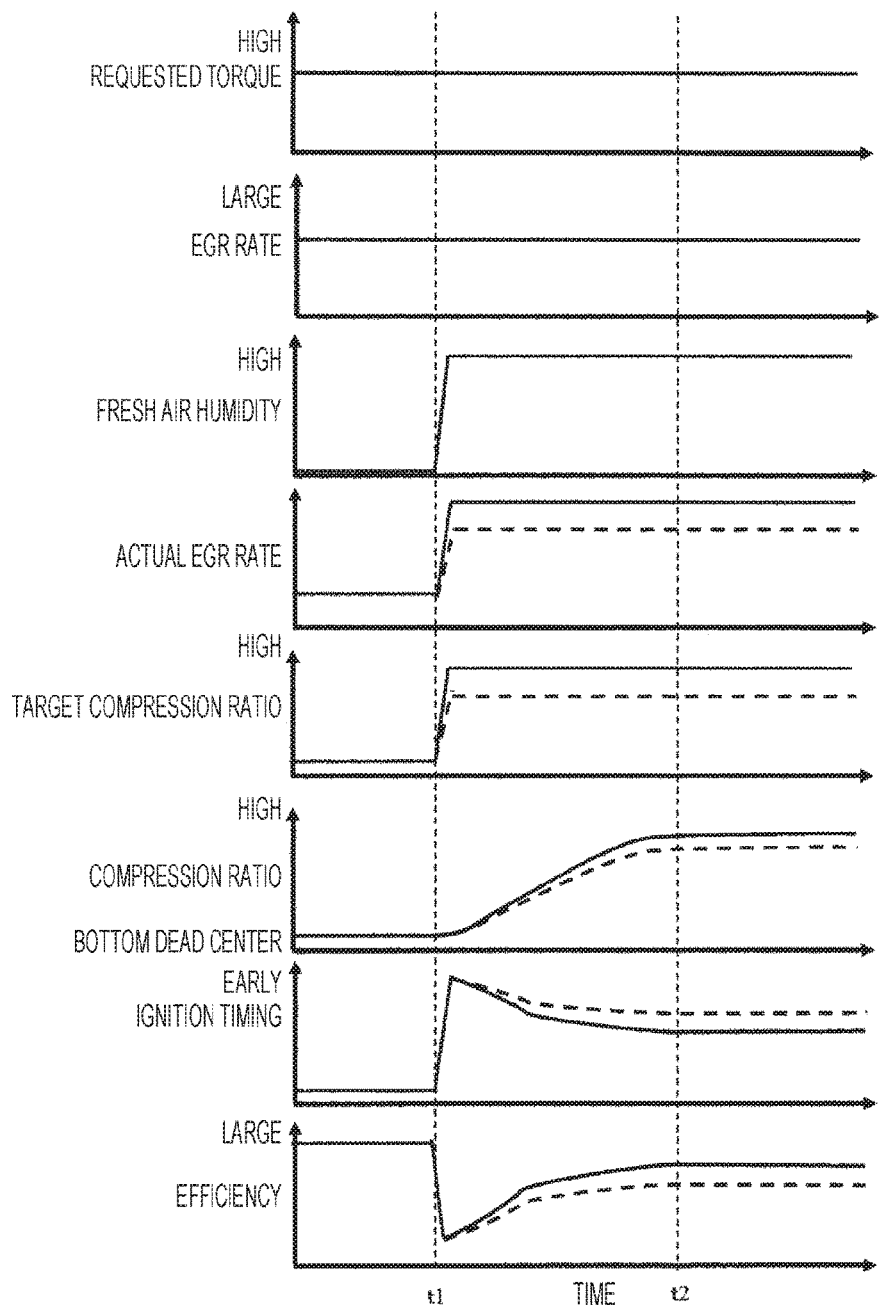
FIG. 18 is a conceptual diagram illustrating various types of operation and engine performance changes at the time of the control of the compression ratio and the ignition timing according to the humidity in the third embodiment.

The movement of the compression ratio and the ignition timing in the case of using the flowchart shown in FIG. 15 is shown in FIG. 18. In this case, a case where α is 1 is denoted with a broken line, and a case where α is 1 or more is denoted with a solid line. For physics where only solid line is listed, it indicates that the broken line is also at the same position. Let the timing when the humidity detected by the humidity sensor 3 changes be t1. When there is no change in the EGR rate, the effective EGR rate changes according to this humidity change. In accordance with this, the setting of the target compression ratio changes to the high compression ratio side. However, the effective EGR rate differs between when α is set to 1 and when it is set to 1 or more, the target compression ratio is also different. The variable compression ratio device 18 is controlled to attain this target value, and the compression ratio is increased. Let the timing when the compression ratio attains the target compression ratio be t2. In accordance with a change in the detection value of the fresh air humidity at time t1, the ignition timing is advanced. Thereafter, in accordance with the change of the mechanical compression ratio, ignition timing is retarded. The ignition timing is made constant at time t2 and thereafter. The target compression ratio when α is set to 1 or more is larger than the compression ratio set when α is set to 1. As a result, the efficiency obtained after raising the compression ratio also improves. If the mass percent is the same, water may inhibit knocking more greatly.

According to the present embodiment, the compression ratio and the ignition timing can be set while the degrees of influence on knocking, which differ between the EGR and the water, are taken into consideration, and therefore, it is possible to maximize efficiency during operation and to reduce fuel consumption deterioration during compression ratio change.

Fourth Embodiment

Figure 19:
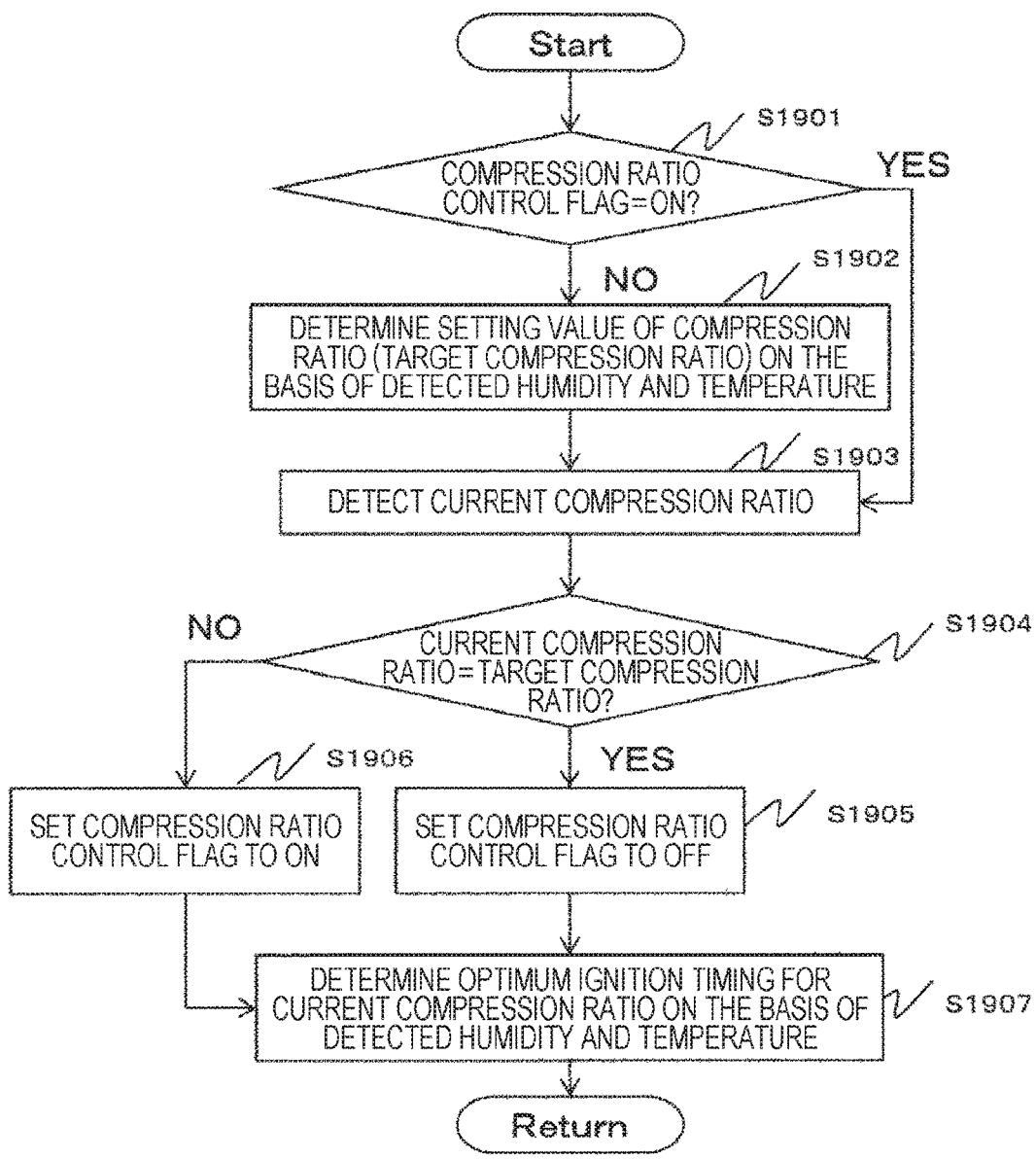
FIG. 19 is a flowchart illustrating control contents of the actual compression ratio and the ignition timing according to the humidity by the control device of the engine according to a fourth embodiment.

Subsequently, the fourth embodiment will be described. FIG. 19 describes computation processing carried out by the compression ratio and ignition timing control unit of FIG. 2. First, in step S1901, a check is performed as to whether the compression ratio control flag indicating whether the compression ratio is under control or not is ON or OFF. In this case, "ON" indicates under control, and "OFF" indicates that the control is inactive. In a case where the compression ratio control flag is ON, step S1903 is subsequently performed. In a case where the compression ratio control flag is OFF, step S1902 is subsequently performed. In step S1902, the setting ratio (target compression ratio) of the compression ratio is determined on the basis of the humidity detected by the humidity sensor 3. In this case, the setting ratio (target compression ratio) of the compression ratio can be determined on the basis of the corresponding characteristics determined in accordance with the detected humidity on the basis of the map of the corresponding characteristics between the compression ratio and the ignition timing determined for each humidity as shown in FIG. 4 stored in the ROM 20d.

Subsequently, the target compression ratio is corrected from the reference temperature and the detection temperature. Where the target compression ratio for the reference temperature is denoted as $\varepsilon_{T0}$, the target compression ratio $\varepsilon_T$ after the correction is determined as follows.

$$\varepsilon_T = \varepsilon_{T0} - \Delta\varepsilon_{T0} \qquad \text{Expression (1)}$$

If the detection temperature is higher than the reference temperature, $\Delta\varepsilon_{T0}$ is 0 or a positive value in expression (1). If the detection temperature is lower than the reference temperature, $\Delta\varepsilon_{T0}$ is a correction value to be 0 or a negative value in expression (1). Specific values are stored in the ROM 20d by changing the intake air temperature and creating correction amounts for various conditions as a map. Qualitatively, the larger the difference between the detection temperature and the reference temperature is, the larger the correction amount $\Delta\varepsilon_{T0}$ is set, and the smaller the difference is, the smaller the correction amount $\Delta\varepsilon_{T0}$ can be set. As temperature increases, knocking tends to occur, so the upper limit of the compression ratio decreases. By making correction in this manner, it is possible to select a compression ratio that can maximize efficiency while suppressing the occurrence of knocking.

Subsequently, in step S1903, the current compression ratio is detected. The current compression ratio is detected. The ROM 20d stores the relationship map between the actuator operation amount and the compression ratio of the variable compression ratio device 18 as shown in FIG. 7 and FIG. 12, and the current compression ratio can be detected on the basis of this map. In step S1904, a detection is performed as to whether the detected current compression ratio is the same as the target compression ratio. In a case where the detected current compression ratio is determined to be the same as the target compression ratio, step S1905 is subsequently performed, and if the detected current compression ratio is determined not to be the same as the target compression ratio, step S1906 is subsequently performed. In step S1905, the compression ratio control flag is set to OFF, and step S1907 is subsequently performed. In step S1906, the compression ratio control flag is set to ON, and step S1907 is subsequently performed. In step S1907, the ignition timing can be determined on the basis of the detected humidity and the detected current compression ratio and the corresponding characteristics between the compression ratio and the ignition timing for each humidity at the reference temperature as shown in FIG. 4 stored in the ROM 20d. More specifically, as shown in FIG. 8, the ignition timing to be set is determined from the relationship of the corresponding characteristics between the compression ratio and the ignition timing for the detected compression ratio and the detected humidity.

In this case, where the ignition timing determined by the corresponding characteristics between the compression ratio and the ignition timing for each humidity at the reference temperature as shown in FIG. 4 is denoted as $ADV_{T0}$ [BTDC], the ignition timing $ADV_T$ after the correction is determined as follows.

$$ADV_T = ADV_{T0} - \Delta ADV \quad (2)$$

In expression (2), when the detection temperature is larger than the reference temperature, $\Delta ADV$ is corrected to 0 or a positive value, i.e., correction is made in a direction of decreasing the advance angle amount. When the detection temperature is smaller than the reference temperature, $\Delta ADV$ is corrected to 0 or a negative value, i.e., correction is made in a direction to increase the advance angle amount. For $\Delta ADV$, a map is prepared through experiment beforehand and is stored in the ROM 20d. Qualitatively, $\Delta ADV$ can be increased as the difference between the detection temperature and the reference temperature is larger, and $\Delta ADV$ can be decreased as the difference between the detection temperature and the reference temperature is smaller. As temperature increases, knocking tends to occur, and therefore, the optimum ignition timing is delayed. By making correction in this way, it is possible to suppress the occurrence of knocking while the compression ratio is changing.

Figure 20:
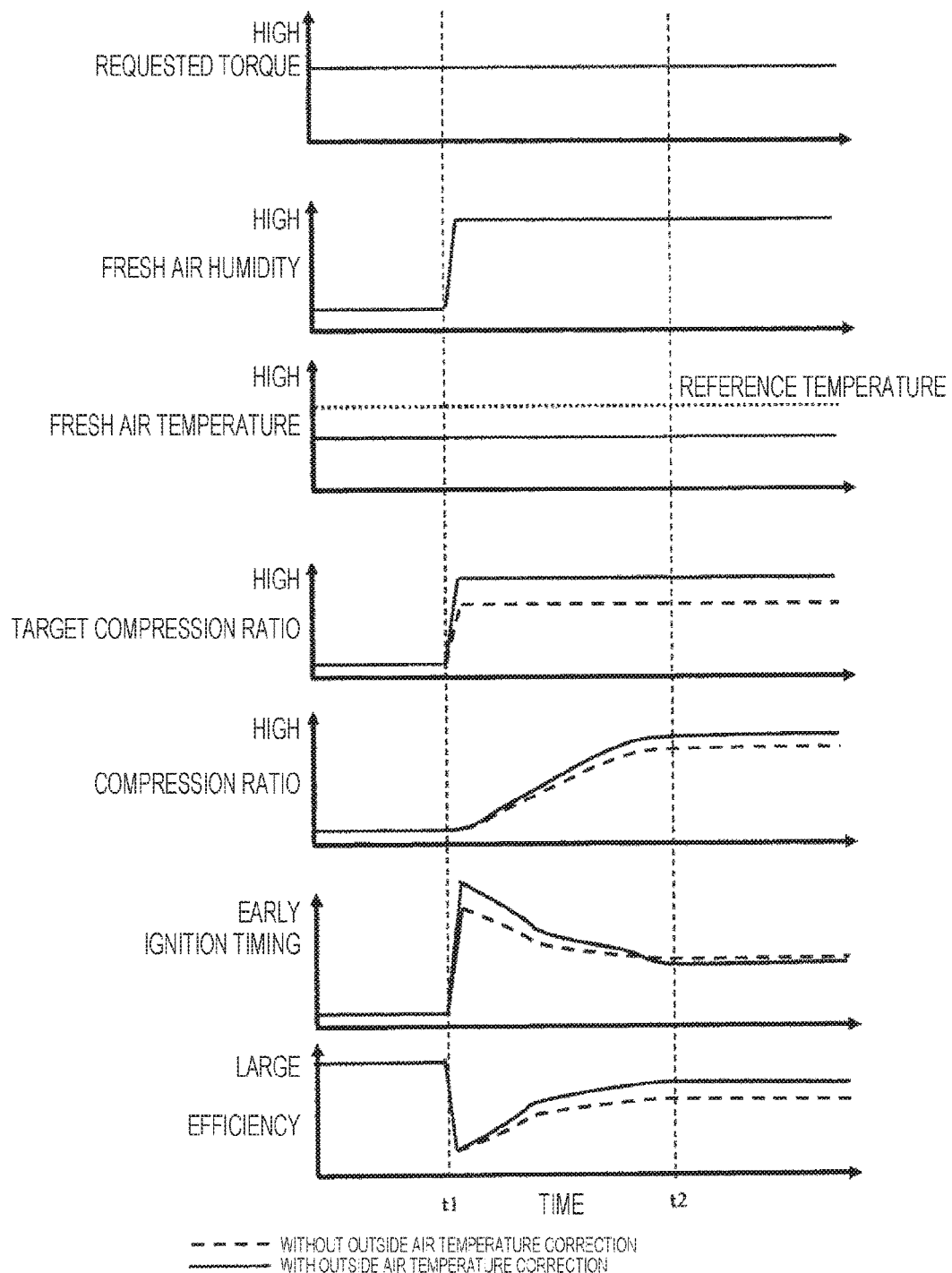
FIG. 20 is a conceptual diagram showing various types of operation and engine performance changes at the time of the control of the compression ratio and the ignition timing according to the humidity in the fourth embodiment.

The movement of the compression ratio and the ignition timing in the case of using the flowchart shown in FIG. 19 is shown in FIG. 20. In this case, a broken line shows a case where there is no correction of expression (1) and expression (2), and a solid line shows a case where there are corrections of expression (1) and expression (2). Let the timing when the humidity detected by the humidity sensor 3 changes be t1. On the basis of this humidity change and the detection temperature, the setting of target compression ratio changes to the high compression ratio side. In this case, when the detection temperature is lower than the reference temperature, a higher compression ratio becomes the target value. The variable compression ratio device 18 is controlled to attain this target value, and the compression ratio is increased. Let the timing when the compression ratio attains the target compression ratio be t2. In accordance with the change in the detection value of the fresh air humidity at time t1, the ignition timing is advanced. Thereafter, in accordance with the change of the mechanical compression ratio, the ignition timing is retarded. The magnitude of the ignition timing differs due to the relationship of the correction by expression (2) in the condition of the reference temperature and the condition of the detection temperature, and as a result, the efficiency is also different.

On the basis of the above-described control, in view of the tendency that, qualitatively, knocking tends to occur when the fresh air temperature rises, it becomes possible to set the compression ratio and the ignition timing which are the most efficient which change according to the difference of the fresh air temperature, and it is possible to suppress the deterioration in the efficiency in the transient condition during the compression ratio control.

Fifth Embodiment

Subsequently, the fifth embodiment will be explained. In addition to the configuration shown in FIG. 5, the engine is configured to have an in-cylinder pressure sensor (not shown).

Figure 21:
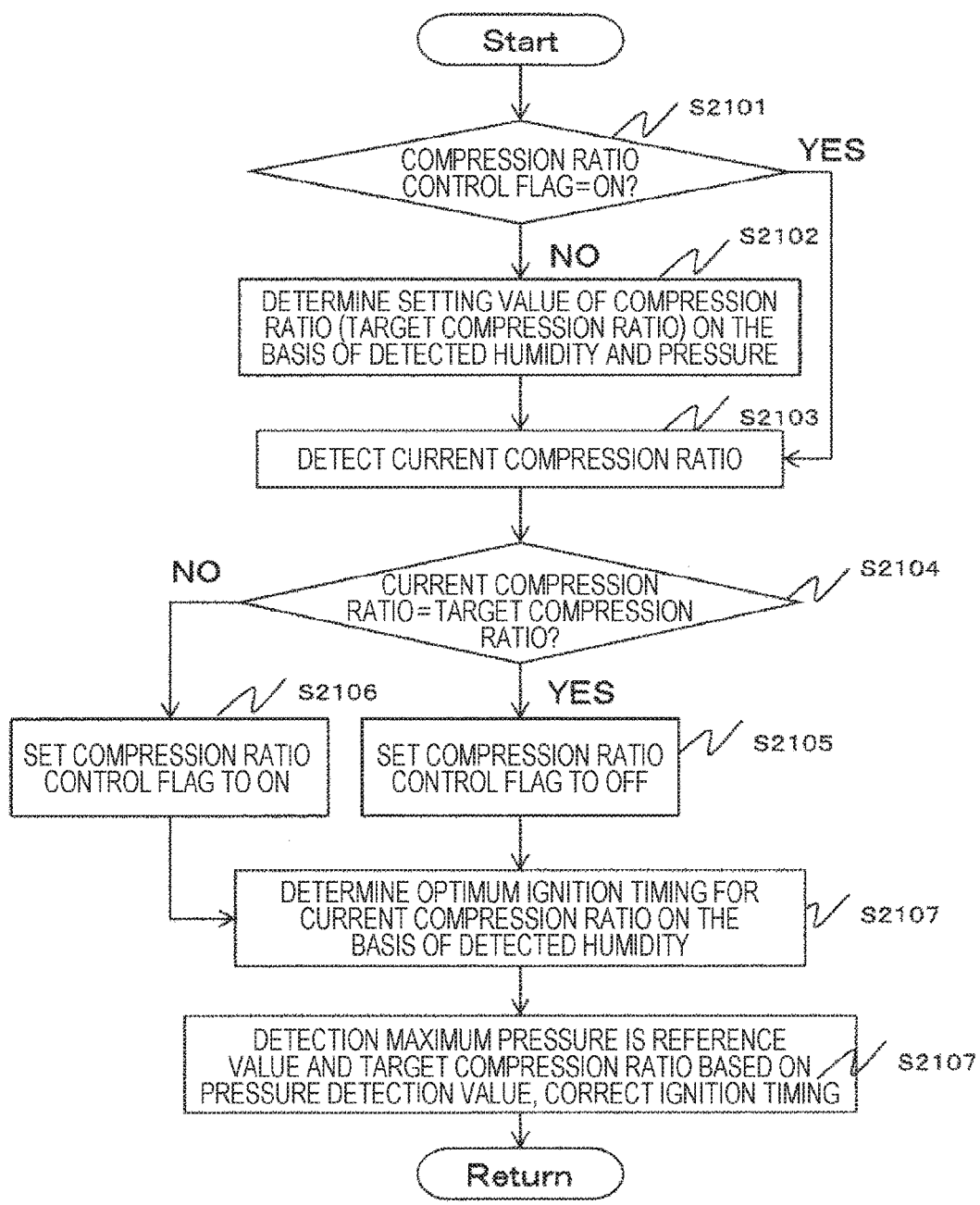
FIG. 21 is a flowchart illustrating control contents of the actual compression ratio and the ignition timing according to the humidity by a control device of an engine according to a fifth embodiment.

FIG. 21 describes computation processing carried out in the compression ratio and ignition timing control unit in FIG. 2. First, in step S2101, a check is performed whether the compression ratio control flag indicating whether the compression ratio is under control or not is ON or OFF. In this case, "ON" indicates under control, and "OFF" indicates that the control is inactive. In a case where the compression ratio control flag is ON, step S2103 is subsequently performed. In a case where the compression ratio control flag is OFF, step S2102 is subsequently performed. In step S2102, the setting ratio (target compression ratio) of the compression ratio is determined on the basis of the humidity detected by the humidity sensor 3. In this case, the target compression ratio can be determined on the basis of the map of the corresponding characteristics between the compression ratio and the ignition timing determined for each humidity as shown in FIG. 4 stored in the ROM 20d and the corresponding characteristics determined in accordance with the detected humidity. Although the compression ratio that maximizes efficiency depends on the humidity, the optimum compression ratio can be selected by determining the compression ratio from the corresponding characteristics in this way. The ROM 20d stores the relationship map between the actuator operation amount and the compression ratio of the variable compression ratio device 18 as shown in FIG. 7 and FIG. 12, and the current compression ratio can be detected on the basis of this map. In step S2104, a detection is performed as to whether the detected current compression ratio is the same as the target compression ratio. In a case where the detected current compression ratio is determined to be the same as the target compression ratio, step S2105 is subsequently performed. In a case where the detected current compression ratio is determined not to be the same as the target compression ratio, step S2106 is subsequently performed. In step S2105, the compression ratio control flag is set to OFF, and step S2107 is subsequently performed. In step S2106, the compression ratio control flag is set to ON, and step S2107 is subsequently performed.

In step S2107, the ignition timing is determined on the basis of the detected humidity and the detected current compression ratio. More specifically, it is shown with reference to FIG. 8. The ignition timing to be set is determined from the relationship of the corresponding characteristics between the compression ratio and the ignition timing for the detected compression ratio and the detected humidity. Step S2107 is executed until the variable compression ratio mechanism changes to the target value. By determining the optimum ignition timing on the basis of the detected compression ratio in this manner, the ignition timing can be set appropriately according to the operation of the slow-response variable compression ratio mechanism, so that the efficiency can be prevented from degrading during the operation of the variable compression ratio mechanism. Even when the target compression ratio is changed, the ignition timing can be set according to this, and the decrease in the efficiency can be prevented.

Subsequently, when the maximum value of the detected pressure exceeds the reference value in step S2108, the target compression ratio is corrected.

$$ADV_P = ADV_{P0} - \Delta ADV_P \quad (3)$$

$$\varepsilon_P = \varepsilon_{P0} - \Delta \varepsilon_P \quad (4)$$

$ADV_{P0}$, $\varepsilon_{P0}$ are the ignition timing and the compression ratio which are set from the corresponding characteristics. $\Delta ADV_P$ is the correction value of the ignition timing. When the maximum value of detection pressure exceeds the reference value, $\Delta ADV_P$ is set to a positive value. Otherwise, $\Delta ADV_P$ is set to 0. $\varepsilon_{P0}$ is the ignition timing and compression ratio which are set from the corresponding characteristics. $\Delta \varepsilon_P$ is the correction value of the compression ratio. If the maximum value of the detection pressure exceeds the reference value, $\Delta \varepsilon_P$ is set to a positive value. Otherwise, $\Delta \varepsilon_P$ is set to 0. For $\Delta \varepsilon_P$, a map is prepared through experiment beforehand and is stored in the ROM 20d, and $\Delta \varepsilon_P$ is determined on the basis of this map. Qualitatively, $\Delta \varepsilon_P$ can be increased as the difference between the detected pressure and the reference pressure is larger. Step S2018 is executed until the compression ratio attains the target value. When the maximum value of the pressure is used as a reference for determining a time immediately before occurrence of knocking, the time zone in which the pressure value exceeds the reference value indicates that it is a time immediately before occurrence of knocking. Whether the knock occurrence is near real time is detected from the in-cylinder pressure, and the compression ratio is corrected, so that the compression ratio can be maximized while avoiding knocking according to in-cylinder environment (water temperature, wall temperature, and the like). As a result, the efficiency improvement range can be maximized.

Figure 22:
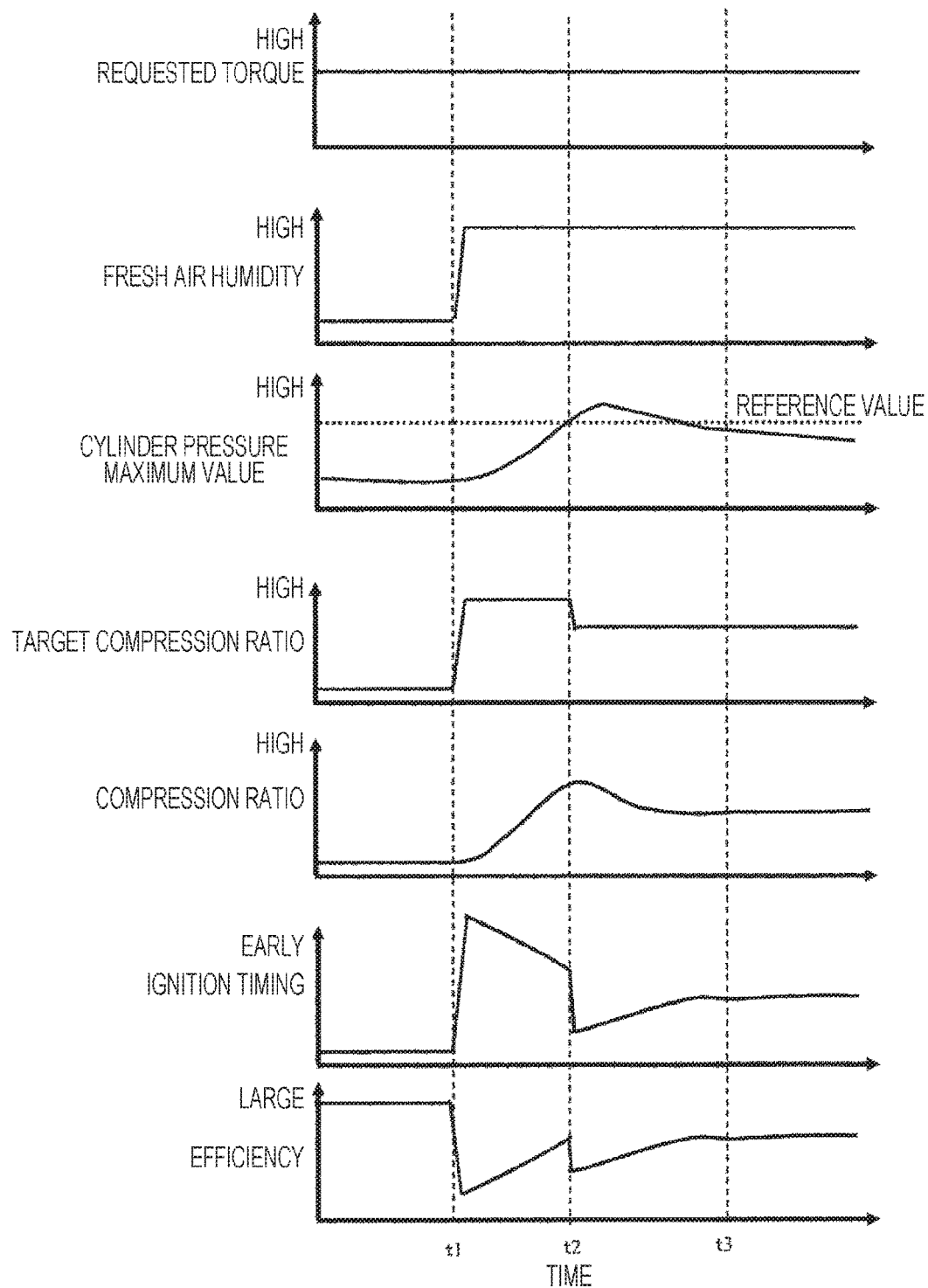
FIG. 22 is a conceptual diagram illustrating various types of operation and engine performance changes at the time of the control of the compression ratio and the ignition timing according to humidity in the fifth embodiment.

The movement of the compression ratio and the ignition timing in the case of using the flowchart shown in FIG. 21 is shown in FIG. 22. Let the timing when the humidity detected by the humidity sensor 3 changes be t1. Let the timing when the maximum value of the in-cylinder pressure exceeds the reference value be t2. On the basis of this humidity change, the setting of target compression ratio changes to the high compression ratio side. The variable compression ratio device 18 is controlled to attain this target value, and the compression ratio is increased. In accordance with the detection value change of the fresh air humidity at time t1, the ignition timing is advanced. Thereafter, in accordance with the change of the mechanical compression ratio, ignition timing is retarded. When the in-cylinder pressure maximum value exceeds the reference value while increasing the compression ratio to high compression ratio, correction of the target compression ratio and the target ignition timing is carried out on the basis of expression (3) and expression (4). As a result, the ignition timing is first retarded, and then, the compression ratio is reduced to realize the changed target compression ratio. In accordance with the reduction of the compression ratio, the ignition timing is controlled on the basis of the corresponding characteristics between the compression ratio and the ignition timing, and therefore, the ignition timing is advanced according to change in the compression ratio.

According to the present embodiment, occurrence of knocking is suppressed, and even if knocking occurs, it is possible to set the maximum compression ratio at which knocking can be avoided on the basis of the detected pressure information, and it becomes possible to perform control to attain the compression ratio which can maximize the efficiency on the basis of the knock occurrence situation which changes according to the external situation.

Sixth Embodiment

Subsequently, the sixth embodiment will be explained. The sixth embodiment is an optimum configuration when the detected humidity decreases rapidly. When the detected humidity rapidly decreases, knocking tends to occur because water having an effect of suppressing knocking decreases. It is necessary to deal with this point.

Figure 23:
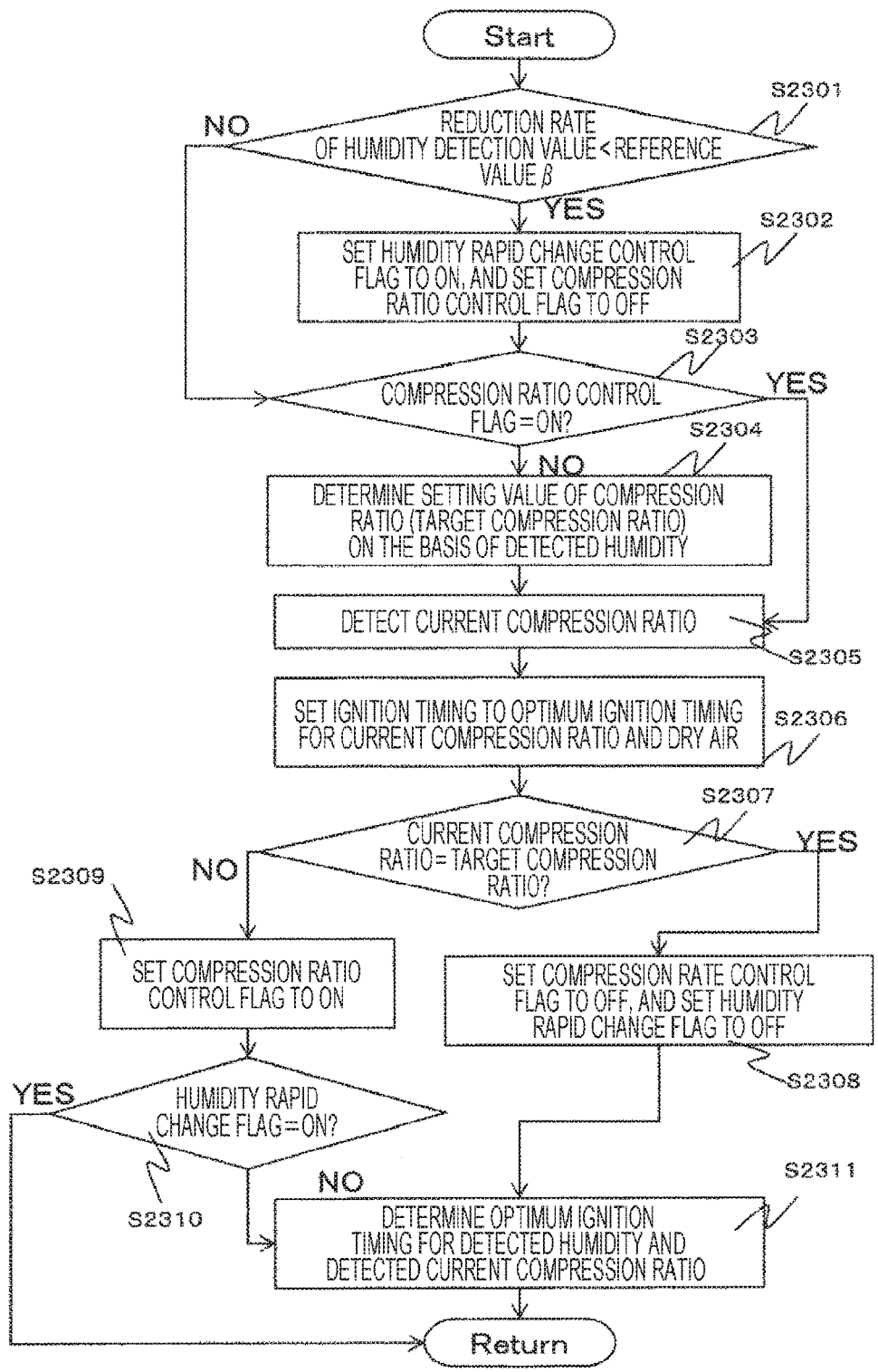
FIG. 23 is a flowchart illustrating control contents of the actual compression ratio and the ignition timing according to the humidity by a control device of an engine according to a sixth embodiment.

FIG. 23 describes computation processing carried out by the compression ratio and ignition timing control unit of FIG. 2. First, in step S2301, a check is performed as to whether the change rate of the humidity detection value is smaller than the reference value. The change rate of humidity detection value is the change amount per unit time, and a positive value of the change rate of the humidity detection value indicates a change in the humidity increasing direction, and a negative value of the change rate of the humidity detection value indicates a change in the humidity decreasing direction. The reference value $\beta$ is experimentally determined and stored in the ECU 20. $\beta$ is a negative value. When the change rate is smaller than the reference value, step S2302 is subsequently performed. When the change rate is more than or equal to the reference value, step S2303 is subsequently performed. In step S2302, the humidity rapid change control flag is set to ON, and the compression ratio control flag is set to OFF, and thereafter, step S2303 is subsequently performed. In this case, a humidity rapid change flag ON is a flag indicating that the change rate of humidity is smaller than the reference value $\beta$. A humidity rapid change flag OFF is a flag indicating that the change rate is larger than the reference value. In this case, the compression ratio control flag ON indicates under control, and the compression ratio control flag "OFF" indicates that the control is inactive. Subsequently, in step S2303, a check is performed as to whether the compression ratio control flag indicating whether the compression ratio is under control is ON or OFF. In a case where the compression ratio control flag is ON, step S2305 is subsequently performed. In a case where the compression ratio control flag is OFF, step S2304 is subsequently performed. In step S2304, the setting value of the compression ratio (target compression ratio) is determined on the basis of the humidity detected by the humidity sensor 3. In this case, the setting value of the compression ratio (target compression ratio) can be determined on the basis of the corresponding characteristics determined in accordance with the detected humidity on the basis of the map of the corresponding characteristics between the compression ratio and the ignition timing determined for each humidity as shown in FIG. 4 stored in the ROM 20d. Subsequently, in step S2305, the current compression ratio is detected. The ROM 20d stores the relationship map between the actuator operation amount and the compression ratio of the variable compression ratio device 18 as shown in FIG. 7 and FIG. 12, and the current compression ratio can be detected on the basis of this map.

Subsequently, in step S2306, the ignition timing is set to the optimum ignition timing in the dry air condition and the current compression ratio. In this case, the ignition timing to be set is retarded as compared with the ignition timing that is set from the current compression ratio, the detected humidity, and the corresponding characteristics between the compression ratio and the ignition timing. The ignition timing that is set here is applied until the current compression ratio attains the target compression ratio. When the detection humidity rapidly decreases, knocking tends to occur because water with the effect of suppressing knocking decreases, and therefore, knocking can be avoided by appropriately retarding the ignition timing.

This can be set from the relationship of FIG. 4. Subsequently, in step step S2307, a detection is performed as to whether the detected current compression ratio is the same as the target compression ratio. In a case where the detected current compression ratio is determined to be the same as the target compression ratio, step S2308 is subsequently performed. In a case where the detected current compression ratio is determined not to be the same as the target compression ratio, step S2309 is subsequently performed. In step S2308, the compression ratio control flag and the humidity rapid change flag are set to OFF, and step S2311 is subsequently performed. In step S2309, the compression ratio control flag is set to ON, and step S2310 is subsequently performed. In step S2310, a determination is made as to whether the humidity rapid change flag is ON or not. When the humidity rapid change flag is ON, a setting ignition timing is output, and the process is completed. If the humidity rapid change flag is OFF, step S2311 is subsequently performed.

In step S2311, the ignition timing is determined on the basis of the detected humidity and the detected current compression ratio. More specifically, this is shown with reference to FIG. 8. The ignition timing to be set is determined from the relationship of the corresponding characteristics between the compression ratio and the ignition timing for the detected compression ratio and the detected humidity. This processing is executed after the condition in which the humidity does not decrease rapidly or after the compression ratio attains the target compression ratio. The ignition timing that is set in step S2306 is set to a sufficiently large ignition retard amount to avoid knocking. Therefore, this is not an optimum ignition timing in the current compression ratio, but the efficiency is decreasing. When the ignition timing is set to ignition timing determined from the relationship of the corresponding characteristics between the compression ratio and the ignition timing, so that it is possible to improve the efficiency lowered by retardation of the ignition timing.

Figure 24:
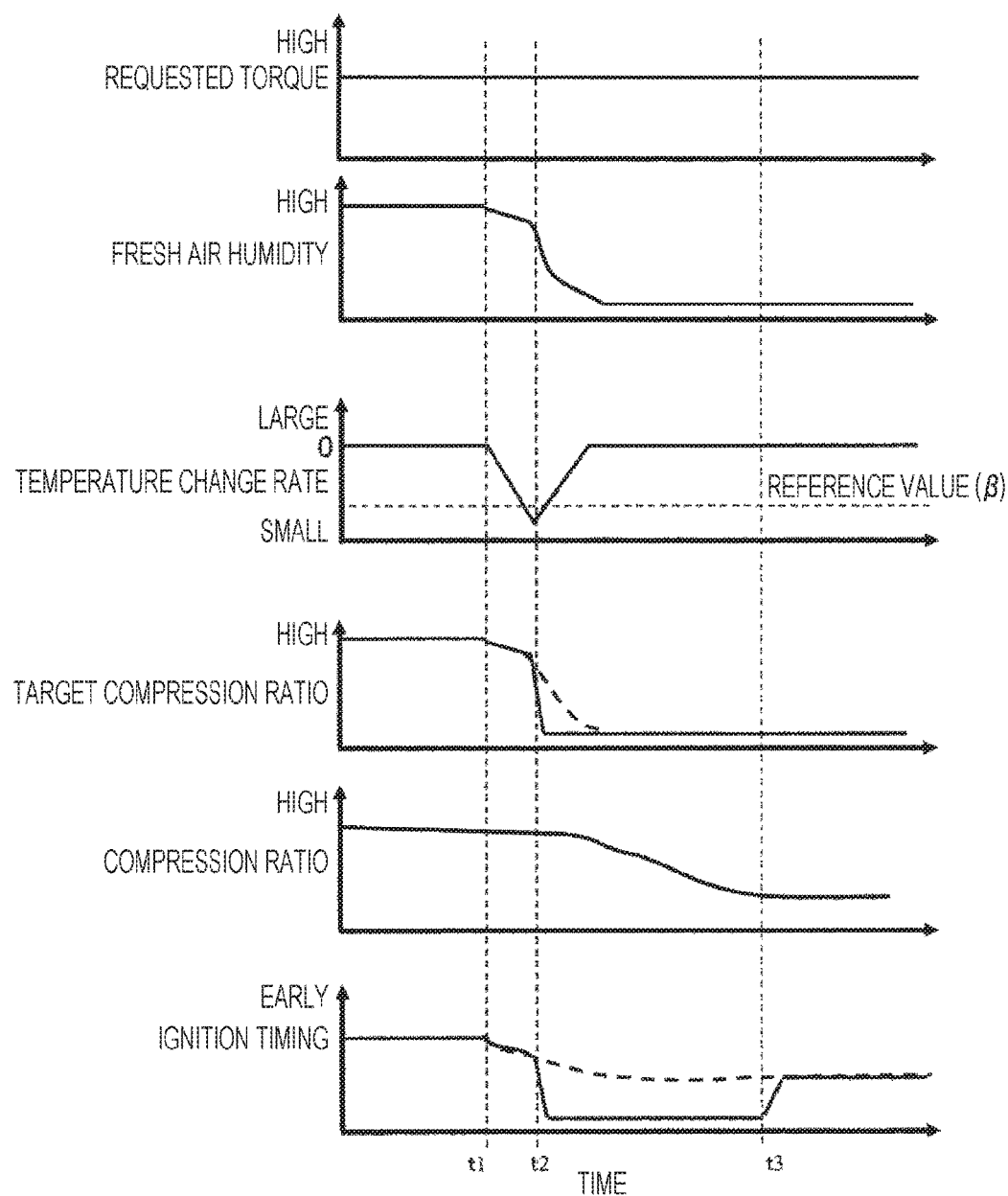
FIG. 24 is a conceptual diagram illustrating various types of operation and engine performance changes at the time of the control of the compression ratio and the ignition timing according to the humidity in the sixth embodiment.

The movement of the compression ratio and the ignition timing in the case of using the flowchart shown in FIG. 23 is shown in FIG. 24. Let the timing when the humidity detected by the humidity sensor 3 changes be t1. Let the timing at which the change rate of humidity falls below the reference value be t2. Let the time at which the compression ratio attains the target compression ratio be t3. Based on this humidity change, setting of target compression ratio changes to the low compression ratio side. The ignition timing also changes according to this change. When the humidity change rate falls below the reference value at time t2, the ignition timing is set to ignition timing for the dry air condition in the detection compression ratio in order to avoid knocking. Thereafter, operation is performed by fixing the ignition timing until the compression ratio reaches the target compression ratio, and the ignition timing is advanced after the compression ratio reaches the target compression ratio. In the case of the same configuration as the first embodiment, the ignition timing is determined based on the compression ratio and the humidity, and accordingly, the ignition timing changes as indicated by the broken line.

According to the above control, when the humidity rapidly decreases (when the change rate is small) and the condition that knocking tends to occur with a condition of a high compression ratio is reached, advance control of the ignition timing can be carried out, and knock suppression can be realized when the humidity rapidly changes, and minimization of efficiency deterioration can be realized.

Seventh Embodiment

Subsequently, the seventh embodiment will be explained. The engine is considered to have the configuration shown in FIG. 5. When the compression ratio changes, the efficiency of the engine improves and the engine torque increases, and therefore, a torque fluctuation occurs. For this reason, when the torque is kept constant, it is necessary to cope with this torque fluctuation.

Figure 26:
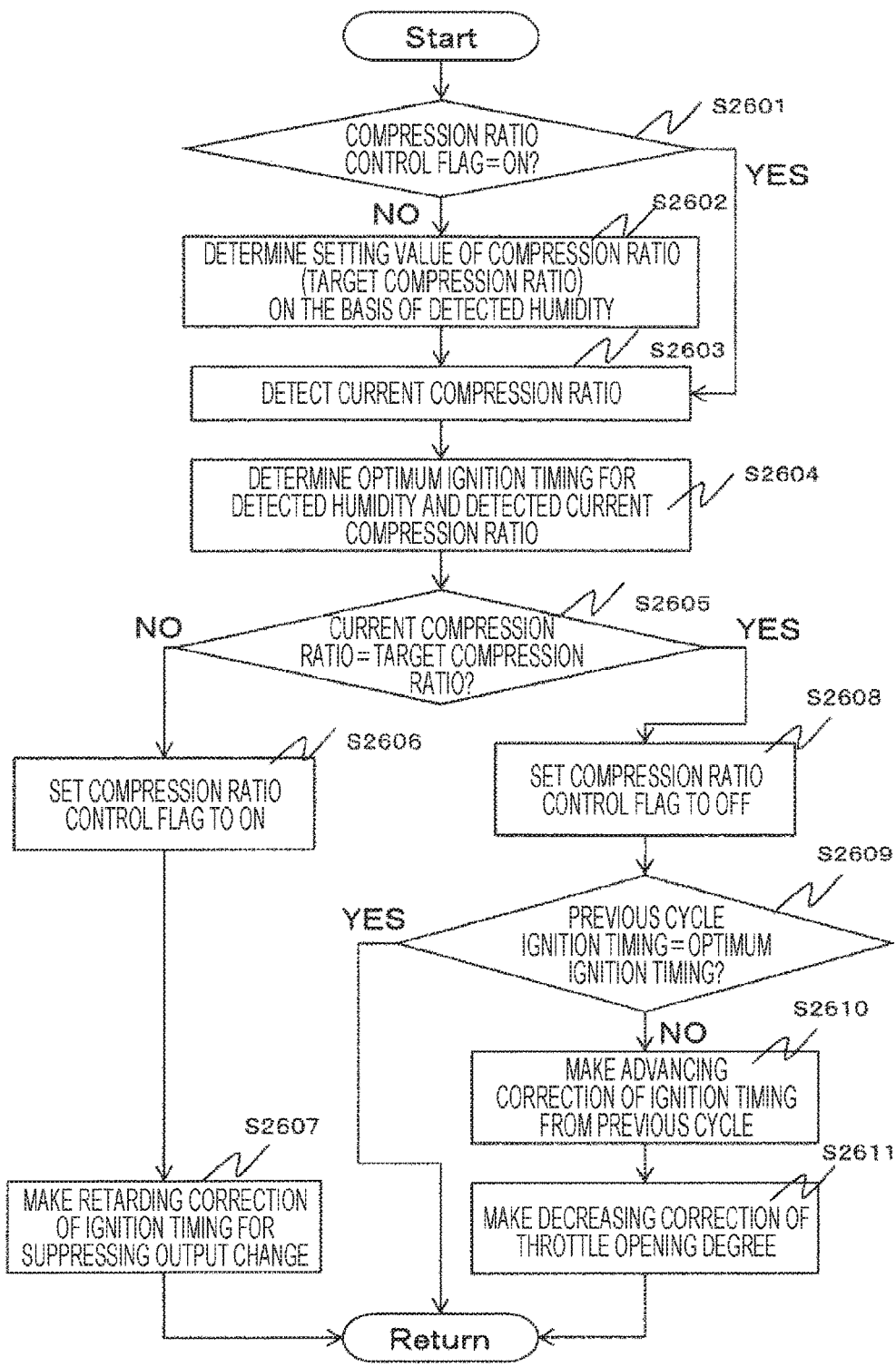
FIG. 26 is a flowchart illustrating the control contents of the actual compression ratio and the ignition timing according to the humidity of the control device of the engine according to the seventh embodiment.

FIG. 26 describes computation processing carried out by the compression ratio and ignition timing control unit of FIG. 2. First, in step S2601, a check is performed as to whether the compression ratio control flag indicating whether the compression ratio is under control is ON or OFF. In this case, "ON" indicates under control, and "OFF" indicates that the control is inactive. In a case where the compression ratio control flag is ON, step S2603 is subsequently performed. In a case where the compression ratio control flag is OFF, step S2602 is subsequently performed.

In step S2602, the setting value of the compression ratio (target compression ratio) is determined based on the detected humidity. In this case, the target compression ratio can be determined from the map of the corresponding characteristics between the actual compression ratio and the ignition timing determined for each humidity as shown in FIG. 4 stored in the ROM 20d and the corresponding characteristics determined in accordance with the detected humidity. Although the compression ratio that maximizes efficiency changes according to the humidity, the optimum compression ratio can be selected by determining the compression ratio from the corresponding characteristics in this manner.

In step S2603, the current compression ratio is detected. The ROM 20d stores the relationship map between the actuator operation amount and the compression ratio of the variable compression ratio device 18 as shown in FIG. 7 and FIG. 12, and the current compression ratio can be detected on the basis of this map. In step S2604, the optimum ignition timing for the detected humidity and the detected current compression ratio is determined. Subsequently, step 2605 is subsequently performed to determine whether the detected current compression ratio is the same as the target compression ratio. In a case where the detected current compression ratio is determined not to be the same as the target compression ratio, step S2606 is subsequently performed. In a case where the detected current compression ratio is determined to be the same as the target compression ratio, step S2608 is subsequently performed. In step S2606, the compression ratio control flag is set to ON, and step S607 is subsequently performed. In step S2608, the compression ratio control flag is set to OFF, and step S2609 is subsequently performed.

Figure 25:
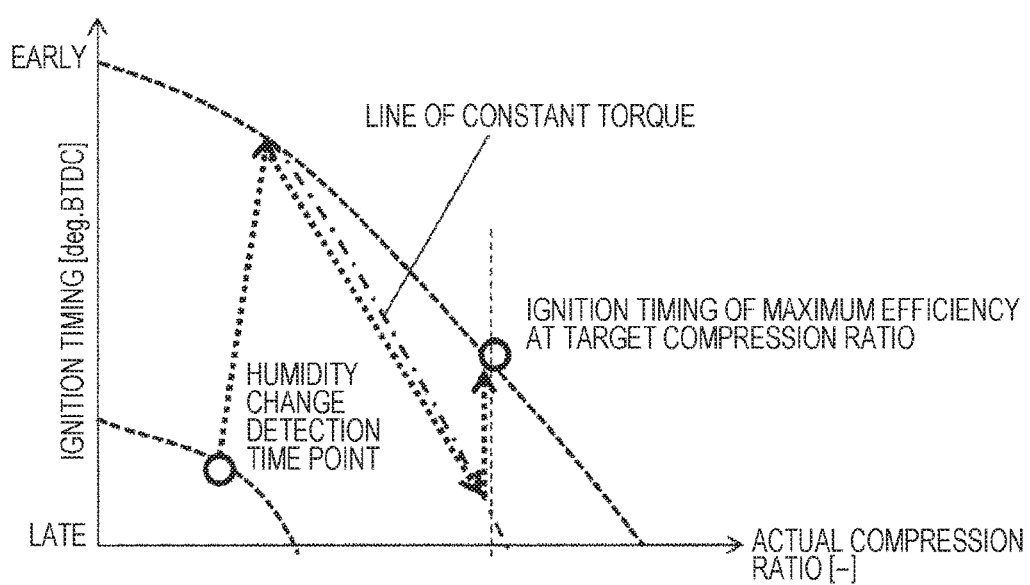
FIG. 25 is a conceptual diagram illustrating ignition timing setting procedure on the basis of the corresponding characteristics of the compression ratio and the ignition timing according to a seventh embodiment.

In step S2607, the ignition timing is determined on the basis of the corresponding characteristics between the compression ratio and the ignition timing determined for each humidity shown in FIG. 25, the detected humidity, and the detected current compression ratio. However, at this occasion, the ignition timing is determined by using the corresponding characteristics between the compression ratio and the ignition timing determined so as to maintain the torque as shown in FIG. 25 instead of using the corresponding characteristics between the compression ratio and the ignition timing determined by the maximum efficiency condition as is done in the other embodiments. Step S2607 is executed until the variable compression ratio mechanism changes to the target value. In this way, the optimum ignition timing is determined on the basis of the detected compression ratio, so that in a case of using the corresponding characteristics determined by the maximum efficiency condition, the thermal efficiency of the engine improves as the compression ratio changes, and as a result, the engine torque increases and decreases, but since it is possible to maintain the torque during the control by the control of the ignition timing, torque variation can be suppressed during the control of the compression ratio.

In step S2609, a determination is made as to whether the ignition timing of the previous cycle is ignition timing (optimum ignition timing) determined by the corresponding characteristics between the compression ratio and the ignition timing determined by the highest efficiency condition. If ignition timing of the previous cycle is the optimum ignition timing, the ignition timing is output and the process is finished. If the ignition timing of the previous cycle is not the optimum ignition timing, step S2610 is subsequently performed. The condition of performing step S2610 is that the ignition timing is not in the efficiency optimum condition for the target compression ratio. Here, in order to improve the efficiency, the ignition timing is corrected to be advanced. Subsequently, step S2011 is subsequently performed, and as a result of ignition advancing correction in step S2010, the efficiency improves, the engine torque increases, and a torque fluctuation occurs. In order to prevent this, the throttle opening degree is corrected to be decreased. This makes it possible to suppress the torque fluctuation during advancement of the ignition timing.

As described above, with the use of the present embodiment, the improvement of the efficiency according to the improvement of the compression ratio is intentionally cancelled by retarding the ignition timing to maintain the efficiency, so that as a result, the output is maintained, and as a result, increase and decrease of the compression ratio is suppressed, and the torque fluctuation caused by the change of engine heat efficiency caused by the change of the ignition timing is suppressed, and it is possible to change the compression ratio according to the humidity. In particular, it is effective in a condition without change in the requested torque. There is a possibility that acceleration unintended by the driver may be caused because of the efficiency improvement caused by the improvement of the compression ratio and torque increase caused by this, but this can be prevented.

The movement of the compression ratio and the ignition timing in the case of using the flowchart shown in FIG. 26 is shown in FIG. 27. Let the timing when the humidity detected by the humidity sensor 3 changes be t1. According to this humidity change, setting of target compression ratio changes to the high compression ratio side. The variable compression ratio mechanism is controlled to attain this target value, and the compression ratio is increased. Let the timing when the compression ratio attains the target compression ratio be t2. In accordance with the detection value change of the fresh air humidity at time t1, the ignition timing is advanced. Thereafter, while the variable compression ratio mechanism changes the compression ratio to the target compression ratio, the ignition timing is retarded in synchronization with the change of the compression ratio. In this case, the retard amount is larger than the highest efficiency condition. From time t2 to time t3, the ignition timing is advanced. Accordingly, the throttle opening degree is narrowed to lower the torque, and the air amount introduced to the engine is reduced. It is possible to control the compression ratio by keeping constant output until the ignition timing which is the highest efficiency at time t3 is set.

According to the present embodiment, when controlling the compression ratio, the torque fluctuation of the engine caused by the improvement of the engine efficiency caused by the improvement of the compression ratio can be suppressed by retarding the ignition timing, and the torque fluctuation during operation can be reduced.

REFERENCE SIGNS LIST

1 air flow sensor
2 electronic control throttle
3 humidity sensor
4 supercharger
4$a$ compressor
4$b$ turbine
5 variable valve
6 intake air manifold
7 intercooler
8 intercooler temperature sensor
9 air-fuel ratio sensor
10 three-way catalyst
11 waste gate valve
12 accelerator opening degree sensor
13 in-cylinder direct injection injector
14 cylinder
15 exhaust pipe
16 ignition coil
17 ignition plug
18 variable compression ratio device
19 crank angle sensor
20 ECU
20$a$ input circuit
20$b$ input and output port
20$c$ RAM
20$d$ ROM
20$e$ CPU
20$f$ electronic control throttle driving circuit
20$g$ injector driving circuit
20$h$ waste gate valve driving circuit
20$j$ intercooler cooling water valve driving circuit
20$k$ transmission driving circuit
20$m$ EGR valve driving circuit
40 EGR tube
41 EGR valve
42 EGR cooler
43 differential pressure sensor
44 EGR temperature sensor
100 engine

The invention claimed is:

1. A control device for an internal combustion engine controlling the internal combustion engine including a cylinder, humidity detection means for detecting humidity of outside air supplied to the cylinder, a variable compression ratio mechanism for changing a compression ratio of the cylinder, and an ignition device igniting air-fuel mixture in the cylinder, the control device comprising:

a compression ratio control unit controlling the variable compression ratio mechanism; and
an ignition control unit controlling ignition timing of the ignition device,
wherein corresponding characteristics indicating characteristics of a relationship between compression ratio and ignition timing are determined for each humidity based on a predetermined condition of an operation state of the internal combustion engine,
the compression ratio control unit determines a target compression ratio of the variable compression ratio mechanism according to the detected humidity, and
during a time period while the variable compression ratio mechanism changes the compression ratio to the target compression ratio determined according to the detected humidity and prior to the target compression ratio being attained, the ignition control unit controls the ignition device on the basis of corresponding characteristics determined according to the detected humidity.

2. A control device for an internal combustion engine controlling the internal combustion engine including a cylinder, humidity detection means for detecting humidity of outside air supplied to the cylinder, a variable compression ratio mechanism for changing a compression ratio of the cylinder, and an ignition device igniting air-fuel mixture in the cylinder,
the control device comprising:
a compression ratio control unit controlling the variable compression ratio mechanism; and
an ignition control unit controlling ignition timing of the ignition device,
the compression ratio control unit determines a target compression ratio of the variable compression ratio mechanism according to the detected humidity,
during a time period while the variable compression ratio mechanism changes the compression ratio to the target compression ratio determined according to the detected humidity and prior to the target compression ratio being attained, the ignition control unit controls the ignition device on the basis of a relationship between ignition timing and compression ratio in which a retard amount of ignition defined for each humidity and an increase amount of a compression rate have a positive correlation.

3. The control device for the internal combustion engine according to claim 1,
wherein the internal combustion engine further includes an EGR mechanism,
the corresponding characteristics between the compression ratio and the ignition timing are determined for each effective EGR rate defined by the humidity and the EGR rate according to a predetermined condition about an operation state of the internal combustion engine, and
while the variable compression ratio mechanism changes a compression ratio to the target compression ratio, the ignition control unit controls the ignition device on the basis of the corresponding characteristics determined according to the detected effective EGR rate.

4. The control device for the internal combustion engine according to claim 1, wherein the internal combustion engine includes temperature detection means for detecting a temperature of outside air,
the ignition timing that is set on the basis of the corresponding characteristics between the compression ratio and the ignition timing determined for each humidity in accordance with a predetermined condition about an operation state is corrected in accordance with the temperature detected by the detection means, and the ignition device is controlled.

5. The control device for the internal combustion engine according to claim 1, wherein the internal combustion engine includes pressure detection means detecting pressure in the cylinder,
the target compression ratio is corrected in the decreasing direction when a maximum value in a combustion cycle of the pressure detected by the pressure detection means exceeds a reference value that is set in advance, and
while the variable compression ratio mechanism changes a compression ratio to the target compression ratio, the ignition control unit controls the ignition device on the basis of corresponding characteristics determined according to the detected humidity.

6. The control device for the internal combustion engine according to claim 1, wherein in a case where a change rate of the detected humidity is less than a reference value when a state changes from a state in which the detected humidity is high to a state in which the detected humidity is low,
the ignition control unit controls the ignition timing to retard the ignition timing,
the compression ratio control unit controls the compression ratio to the target compression ratio that is set according to the humidity, and
after the compression ratio attains the target compression ratio, the ignition control unit controls the ignition device on the basis of corresponding characteristics determined according to the compression ratio and the detected humidity.

7. The control device for the internal combustion engine according to claim 1, wherein the internal combustion engine includes a device controlling air amount flowing into the cylinder, and includes an air amount control unit controlling the device controlling the air amount,
wherein when a control for increasing a compression ratio is carried out,
the ignition control unit carries out control for retarding ignition timing as compared with setting of ignition timing on the basis of corresponding characteristics determined according to the compression ratio and the detected humidity, and
after the compression ratio attains a target compression ratio, control is performed so that a decrease amount of air amount flowing into the cylinder by the air amount control unit and an advance angle amount of ignition timing by the ignition control unit have a positive correlation.

8. The control device for the internal combustion engine according to claim 2, wherein the internal combustion engine includes a device controlling air amount flowing into the cylinder, and includes an air amount control unit controlling the device controlling the air amount,
after the compression ratio attains a target compression ratio, control is performed so that a decrease amount of air amount flowing into the cylinder by the air amount control unit and an advance angle amount of ignition timing by the ignition control unit have a positive correlation.

9. The control device for the internal combustion engine according to claim 1, wherein the internal combustion engine includes a device controlling air amount flowing into the cylinder, and includes an air amount control unit controlling the device controlling the air amount, wherein means for detecting a requested torque for the internal combustion engine is provided, under a condition of variation where a change in the requested torque detected by the requested torque detection means stays within a predetermined range, when the humidity detected by the humidity detection means changes, after the compression ratio attains a target compression ratio, control is performed so that a decrease amount of air amount flowing into the cylinder by the air amount control unit and an advance angle amount of ignition timing by the ignition control unit have a positive correlation.

10. The control device for the internal combustion engine according to claim 2, wherein the internal combustion engine includes a device controlling air amount flowing into the cylinder, and includes an air amount control unit controlling the device controlling the air amount, wherein means for detecting a requested torque for the internal combustion engine is provided, under a condition of variation where a change in the requested torque detected by the requested torque detection means stays within a predetermined range, when the humidity detected by the humidity detection means changes, after the compression ratio attains a target compression ratio, control is performed so that a decrease amount of air amount flowing into the cylinder by the air amount control unit and an advance angle amount of ignition timing by the ignition control unit have a positive correlation.

11. The control device for the internal combustion engine according to claim 1, wherein the corresponding characteristics are determined by the control device.

12. The control device for the internal combustion engine according to claim 1, wherein the corresponding characteristics are determined by the control device using a map of engine map data stored in a memory of the control device.

* * * * *